US009949193B2

(12) United States Patent
Höglund et al.

(10) Patent No.: US 9,949,193 B2
(45) Date of Patent: Apr. 17, 2018

(54) METHODS, A NETWORK NODE AND A WIRELESS DEVICE FOR SUPPORTING HANDOVER IN A CELLULAR COMMUNICATIONS NETWORK

(71) Applicant: Telefonaktiebolaget L M Ericsson (publ), Stockholm (SE)

(72) Inventors: Andreas Höglund, Solna (SE); Mårten Ericson, Luleå (SE); Henrik Nyberg, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/441,926

(22) PCT Filed: Nov. 15, 2012

(86) PCT No.: PCT/SE2012/051264
§ 371 (c)(1),
(2) Date: May 11, 2015

(87) PCT Pub. No.: WO2014/077747
PCT Pub. Date: May 22, 2014

(65) Prior Publication Data
US 2015/0312825 A1 Oct. 29, 2015

(51) Int. Cl.
*H04W 36/18* (2009.01)
*H04W 52/40* (2009.01)
(Continued)

(52) U.S. Cl.
CPC ....... *H04W 36/18* (2013.01); *H04W 36/0088* (2013.01); *H04W 52/40* (2013.01); *H04W 36/0094* (2013.01); *H04W 84/045* (2013.01)

(58) Field of Classification Search
CPC . H04W 36/18; H04W 52/40; H04W 36/0088; H04W 36/0094; H04W 84/045
See application file for complete search history.

(56) References Cited

U.S. PATENT DOCUMENTS 8,463,270 B2 *  6/2013  Thorson ............ H04W 36/0055
                                                370/338
2002/0037725 A1  3/2002  Masuda et al.
(Continued)

FOREIGN PATENT DOCUMENTS

EP   1499147 A1    1/2005
WO   03/094540 A1  11/2003
(Continued)

OTHER PUBLICATIONS

Author Unknown, "Technical Specification Group Radio Access Network; Radio Resource Control (RRC); Protocol specification (Release 9)," Technical Specification 25.331, Version 9.10.0, 3GPP Organizational Partners, Mar. 2012, *** pages.
(Continued)

*Primary Examiner* — Chirag Shah
*Assistant Examiner* — Joshua Smith
(74) *Attorney, Agent, or Firm* — Withrow & Terranova, PLLC

(57) ABSTRACT

A way to support a handover of a wireless device from a serving cell being served by a serving base station to a candidate cell being served by a candidate base station is disclosed. A network node determines a respective value of one or more parameters for affecting a range for soft handover. The range of soft handover is applied by the wireless device to determine if the candidate cell is a subject for soft handover. At least one respective value of the one or more parameters is determined based on output power of a transmitter of the serving base station for serving the serving cell and/or of a transmitter of the candidate base station for serving the candidate cell. The network node provides a sending of the respective value of the one or more parameters to the wireless device.

32 Claims, 12 Drawing Sheets

(51) Int. Cl.
 H04W 36/00 (2009.01)
 H04W 84/04 (2009.01)

(56) References Cited

U.S. PATENT DOCUMENTS

| | | | | |
|---|---|---|---|---|
| 2003/0060201 A1* | 3/2003 | Soliman | H04W 36/32 | 455/442 |
| 2009/0069012 A1* | 3/2009 | Tu | H04W 36/30 | 455/436 |
| 2009/0323638 A1* | 12/2009 | Catovic | H04W 36/0083 | 370/331 |
| 2010/0216456 A1 | 8/2010 | Fried et al. | | |
| 2010/0273487 A1* | 10/2010 | Alonso-Rubio | H04W 36/385 | 455/436 |
| 2011/0222472 A1* | 9/2011 | Breit | H04L 1/0026 | 370/328 |
| 2011/0222473 A1* | 9/2011 | Breit | H04L 1/0026 | 370/328 |
| 2011/0223914 A1* | 9/2011 | Hashimoto | H04W 36/0083 | 455/436 |
| 2011/0263260 A1* | 10/2011 | Yavuz | H04W 36/0083 | 455/437 |
| 2012/0021745 A1 | 1/2012 | Tu | | |
| 2012/0082028 A1* | 4/2012 | Kojima | H04W 36/22 | 370/230 |
| 2012/0093128 A1* | 4/2012 | Song | H04W 36/0077 | 370/331 |
| 2012/0134339 A1* | 5/2012 | Joe | H04W 12/06 | 370/331 |
| 2014/0064247 A1* | 3/2014 | Teyeb | H04W 36/0083 | 370/331 |

FOREIGN PATENT DOCUMENTS

| | | |
|---|---|---|
| WO | 2007/113267 A2 | 10/2007 |
| WO | 2011/126417 A1 | 10/2011 |
| WO | 2011/126932 A1 | 10/2011 |
| WO | 2012/150880 A1 | 11/2012 |

OTHER PUBLICATIONS

Author Unknown, "Technical Specification Group Radio Access Network; Radio Resource Control (RRC); Protocol specification (Release 11)," Technical Specification 25.331, Version 11.2.0, 3GPP Organizational Partners, Jun. 2012, 1944 pages.

International Search Report and Written Opinion for PCT/SE2012/051264, dated Dec. 18, 2013, 11 pages.

Ericsson, et al., "R1-125219: LPN Range Expansion in Co-Channel Deployment in Heterogeneous Networks," 3rd Generation Partnership Project (3GPP), TSG-RAN WG1 #71, Nov. 12-16, 2012, 7 pages, New Orleans, Louisiana.

Ericsson, et al., "R1-125223: On Control Channel Robustness for Heterogeneous Networks," 3rd Generation Partnership Project (3GPP) TSG RAN WG1 Meeting #71, Nov. 12-16, 2012, 4 pages, New Orleans, Louisiana.

European Search Report for European Patent Application No. 12888338.6, dated Nov. 26, 2015, 4 pages.

* cited by examiner

METHODS, A NETWORK NODE AND A WIRELESS DEVICE FOR SUPPORTING HANDOVER IN A CELLULAR COMMUNICATIONS NETWORK

This application is a 35 U.S.C. § 371 national phase filing of International Application No. PCT/SE2012/051264, filed Nov. 15, 2012, the disclosure of which is incorporated herein by reference in its entirety.

TECHNICAL FIELD

Embodiments herein relate to a method in a network node, a network node, a method in a wireless device and a wireless device. In particular embodiments herein relate to supporting handover of the wireless device from a serving base station to a candidate base station in a cellular communications network.

BACKGROUND

Communication devices such as wireless devices may be also known as e.g. user equipments, mobile terminals, wireless terminals and/or mobile stations. A wireless device is enabled to communicate wirelessly in a cellular communications network, wireless communications system, or radio communications system, sometimes also referred to as a cellular radio system or cellular network. The communication may be performed e.g. between two wireless devices, between a wireless device and a regular telephone and/or between a wireless device and a server via a Radio Access Network (RAN) and possibly one or more core networks, comprised within the cellular communications network.

The wireless device may further be referred to as a mobile telephone, cellular telephone, laptop, Personal Digital Assistant (PDA), tablet computer, surf plate, just to mention some further examples. The wireless device in the present context may be, for example, portable, pocket-storable, hand-held, computer-comprised, or vehicle-mounted mobile device, enabled to communicate voice and/or data, via the RAN, with another entity, such as another wireless device or a server.

The cellular communications network covers a geographical area which is divided into cell areas, wherein each cell area being served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or PICO base station, based on transmission power and thereby also cell size. A cell is the geographical area where radio coverage is provided by the base station at a base station site. By the base station serving a cell is meant that the radio coverage is provided such that one or more wireless devices located in the geographical area where the radio coverage is provided may be served by the base station. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Special Mobile). In 3rd Generation Partnership Project (3GPP) Long Term Evolution (LTE), base stations, which may be referred to as eNodeBs or eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Moreover, the 3GPP has undertaken to evolve further the UTRAN and GSM based radio access network technologies, for example into evolved UTRAN (E-UTRAN) used in LTE.

In the context of this disclosure, the expression downlink (DL) is used for the transmission path from the base station to the wireless device. The expression uplink (UL) is used for the transmission path in the opposite direction i.e. from the wireless device to the base station.

A heterogeneous network (hetnet) is a network with more than one cell type and/or base station type. The difference between the different cell and/or base station types may relate to several different features, but most often there is a difference between the maximum transmit power (i.e. the power amplifiers differ) which also relates to the cell size. A typical hetnet scenario comprises a higher power cell and a lower power cell, which may be referred to as macro cell and PICO cell respectively, where the macro cell is served by a base station transmitting with higher power than a base station serving the PICO cell. The purpose of PICO cells in general is often to offload macro cells and increase the capacity per area unit. The downlink power from the macro cell is typically much higher than from the PICO cell (e.g. 20 W to 2 W) and the macro cell will cover a larger area in the downlink compared to the PICO cell. When a downlink connection is equally good from the macro and the PICO cell, the PICO uplink connection may be much better, e.g. 20/2=10 times better in case of the example of a 20 W vs. 2 W power difference. In heterogeneous networks there may thus be locations where a wireless device has the best downlink connection when served in a macro cell, since the macro cell transmits with higher power, but at the same time a better uplink connection when served in the PICO cell, since the wireless device transmits with same power to both the macro and PICO cell but may be located closer to the PICO cell. Such lack of compliance between downlink and uplink connections is related to several problems.

A first problem is when the reason for adding the PICO cell is to offload the macro cell as much as possible, i.e. it is desirable that wireless devices are served in the PICO cell. This is however counteracted to some extent by the higher downlink transmitting power from the macro cell since a wireless device will receive a relatively higher signal strength from the macro cell, which typically is what determines the choice of serving cell and base station.

A second problem is that a wireless device that is closer to the PICO cell than to the maro cell may be served in the macro cell even though there is actually a better UL connection to the PICO cell. As a consequence, such a wireless device will experience worse link performance than if it had been served by the PICO cell, at least in the uplink.

A third problem is that a wireless device that is served in the macro cell and located in the outskirt of the macro cell, close to a border of the PICO cell, will transmit with relatively high power in the uplink to the macro cell and thereby cause relatively high interference to communications in the closer PICO cell. This has negative impact on the uplink performance of any wireless device being served in the PICO cell, which e.g. may be identified by studying measurement graphs from interference measurements of neighbouring cells.

SUMMARY

An object of embodiments herein is to enable improved handling in a heterogenous cellular communications network.

According to a first aspect of embodiments herein, the object is achieved by a method in a network node for supporting a handover of a wireless device from a serving cell being served by a serving base station to a candidate cell being served by a candidate base station. The network node, the serving base station and the candidate base station are comprised in a cellular communications network. The network node determines a respective value of one or more parameters for affecting a range for soft handover. The range of soft handover is applied by the wireless device to determine if the candidate cell is a subject for soft handover. At least one respective value of the one or more parameters is determined based on output power of a transmitter of the serving base station for serving the serving cell and/or of a transmitter of the candidate base station for serving the candidate cell. The network node provides a sending of the respective value of the one or more parameters to the wireless device.

According to a second aspect of embodiments herein, the object is achieved by a method in a wireless device for supporting a handover of the wireless device from a serving cell being served by a serving base station to a candidate cell being served by a candidate base station. The serving base station and the candidate base station are comprised in a cellular communications network. The wireless device receives, from a network node, via the serving base station and/or via the candidate base station, a respective value of one or more parameters that affect a range for soft handover applied by the wireless device. At least one respective value of the one or more parameters is determined based on output power of a transmitter of the serving base station for serving the serving cell and/or of a transmitter of the candidate base station for serving the candidate cell. The wireless device applies the range for soft handover to determine if the candidate cell is a subject for soft handover, which range for soft handover is affected by the respective value of the one or more parameters.

According to a third aspect of embodiments herein, the object is achieved by a network node for supporting a handover of a wireless device from a serving cell being served by a serving base station to a candidate cell being served by a candidate base station. The network node, the serving base station and the candidate base station are comprised in a cellular communications network. The network node comprises an determining circuitry configured to determine a respective value of one or more parameters for affecting a range for soft handover. The range of soft handover is applied by the wireless device to determine if the candidate cell is a subject for soft handover. At least one respective value of the one or more parameters is determined based on output power of a transmitter of the serving base station for serving the serving cell and/or of a transmitter of the candidate base station for serving the candidate cell. The network node further comprises a providing circuitry configured to provide a sending of the respective value of the one or more parameters to the wireless device.

According to a fourth aspect of embodiments herein, the object is achieved by a wireless device for supporting a handover of the wireless device from a serving cell being served by a serving base station to a candidate cell being served by a candidate base station. The serving base station and the candidate base station are comprised in a cellular communications network. The wireless device comprises a receiving port configured to receive, from a network node, via the serving base station and/or via the candidate base station, a respective value of one or more parameters that affect a range for soft handover applied by the wireless device. At least one respective value of the one or more parameters is determined based on output power of a transmitter of the serving base station for serving the serving cell and/or of a transmitter of the candidate base station for serving the candidate cell. The wireless device further comprises an applying circuitry configured to apply the range for soft handover to determine if the candidate cell is a subject for soft handover, which range for soft handover is affected by the respective value of the one or more parameters.

To enable improved handling in a heterogeneous cellular communications network it is desirable to be able to extend ranges of soft handover that are applied by the wireless device, in particular so that an imbalance region is included. The imbalance region is a region where e.g. the serving cell offers the best downlink but the candidate cell the best uplink. The embodiments herein enable, through said respective value of the one or more parameters, the wireless device to extend the ranges for soft handover to cover the imbalance region. At the same time embodiments herein enable avoidance, or at least reduction, of negative side effects that may occur when ranges for soft handover are extended. Examples of negative side effects are that ranges for soft handover risk to be undesirably extended where there is no imbalance region and/or that the network node, as a result from an extended range for soft handover, risk to become restricted in possibilities to affect when an actual handover is to be carried out.

BRIEF DESCRIPTION OF THE DRAWINGS

Examples of embodiments herein are described in more detail with reference to the appended schematic drawings, in which.

DETAILED DESCRIPTION

Figure 1:
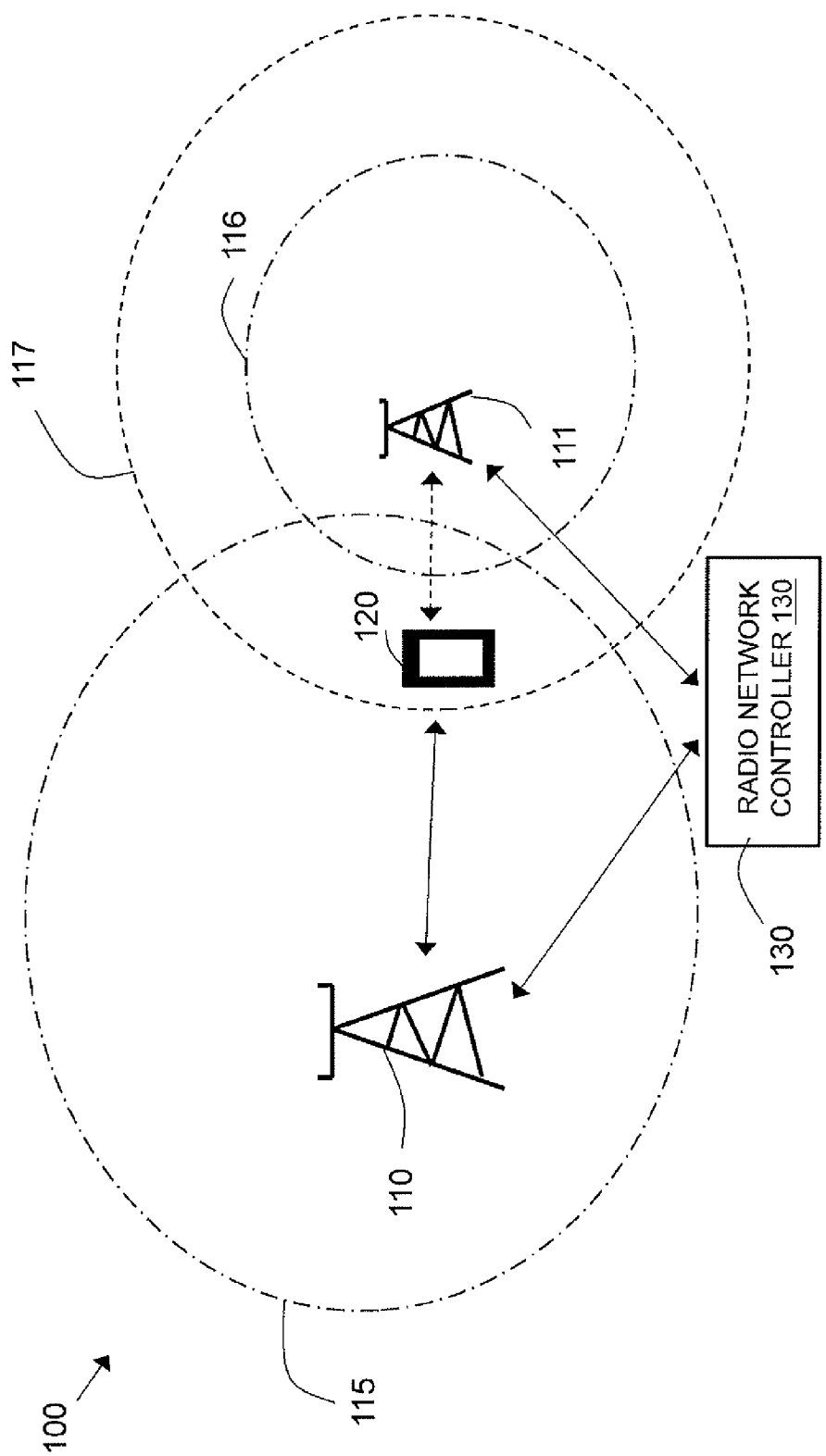
FIG. 1 is a schematic block diagram depicting an example of a cellular communications network.

FIG. 1 is a schematic block diagram depicting an example of a cellular communications network 100 in which a wireless device 120 is located. The cellular communications network 100 is relevant for embodiments herein and may correspond, but is not limited, to a HSPA/WCDMA type of cellular communications network. The shown cellular communications network 100 comprises a serving base station 110 currently serving the wireless device 120 in a serving cell 115 and a candidate base station 111 serving a candidate cell 116 which is thus a candidate for handover of the device 120. For purpose of facilitating understanding of embodiments herein, the serving cell 115 may be assumed to be a macro cell and the candidate cell 116 may be assumed to be a PICO cell. The meaning of macro cell and PICO cell should be recognized by the skilled person and was also explained above in the Background. A border of respective cell, e.g. cells 115, 116, of the cellular communications network 100, may be defined by locations where the respective cell provides an equally good downlink quality as a neighbour cell providing the best downlink quality, which may be determined by downlink power measurements.

Located and served by the serving base station 110 in the serving cell 115 is thus the wireless device 120. The candidate cell 116 is neighbouring the serving cell 115, meaning that there are locations where the wireless device 120 is within radio coverage of both the cell 115 and 116. The wireless device 120 is shown located at such location, illustrated by that the wireless device is within a radio coverage area 117 of the cell 116. The candidate cell 116 is a candidate for a handover of the wireless device 120, that is, a cell where the wireless device may be served next. Accomplishing of the handover would in this case thus involve change of the wireless device 120 from being served by the serving base station 110 in the serving cell 115 to instead being served by the candidate base station 111 in the candidate cell 116.

The cellular communications network 100 further comprises a Radio Network Controller (RNC) 130 being an example of a network node for connecting and controlling base stations of the cellular communications network 100, here the serving base station 110 and the candidate base station 111.

It should be noted that FIG. 1 is only schematic and for exemplifying purpose. The cellular communications network 100 may in reality comprise several further cells, base stations, wireless devices, and other network nodes, which are not shown herein for simplicity. Hence, the situation shown in FIG. 1 and discussed above, is not in every detail a prerequisite for embodiments herein, as should be understood by the skilled person, and in particular when considering the present disclosure as a whole. For example, in FIG. 1 the candidate cell 116 is shown partly overlapping the serving cell 115, but may in some embodiments be a PICO cell that is fully overlapped or covered by the serving cell 115. In some embodiments the serving cell 115 may be a PICO cell that is partly or fully overlapped or covered by the candidate cell 116. In some embodiments there may be substantially no overlap between the serving cell 115 and the candidate cell 116. In some embodiments the RNC 130 may be a network node referred to by another name and although the RNC 130 is typically a separate network node and/or physical unit, there may be embodiments where the RNC 130 is integrated with another network node and/or physical unit having also other functionality, e.g. in one or more of the base stations 110, 111.

As part of the development towards embodiments herein, the applicant has identified some problems with using conventional technique which will first be discussed below, with reference to the cellular communications network 100 and with reference to and examples from particularly HSPA/WCDMA.

First the concept of soft handover (SHO) and some terminology used in the following will be explained. In general, soft handover involves establishing some connection in advance between a wireless device, e.g. the wireless device 120, and a cell, e.g. the candidate cell 116, for facilitating an actual handover if/when a handover decision is taken. For example in order to be able to carry out a faster and/or more reliable/seamless handover than otherwise would be the case. For implementation of soft handover, the soft handover may be explicitly or implicitly associated with a range for soft handover. The range for soft handover typically corresponds to a range of differences in downlink measurements performed by the wireless device 120 on the best cell, typically the serving cell 115, and on the candidate cell 116, within which range it is desirable that the wireless device 120 becomes and remains, at least partly connected to the candidate cell 116 in order to facilitate a possible actual handover, i.e. change of the wireless device from being served by the serving base station in the serving cell to instead being served by the candidate base station in the candidate cell. The downlink measurements on the cells are performed on signals, typically reference signals, in the respective cell 115, 116, which reference signals in respective cell are transmitted by the base station serving the respective cell.

When there is no connection established between the wireless device 120 and the candidate cell 116, the range for soft handover determines how much inferior the downlink measurement on the candidate cell 116 is allowed to be compared to the downlink measurement on the best cell, typically the serving cell 115, in order for the candidate cell 116 to be a subject for soft handover. Thus, when the difference between the downlink measurement on the candidate cell 116 and the downlink measurement on the best cell, typically the serving cell 115, is identified to be within the range for soft handover, the candidate cell 116 becomes and remains subject for soft handover.

When there is already a connection established between the wireless device 120 and the candidate cell 116, the range for soft handover determines how much inferior the downlink measurement on the candidate cell 116 is allowed to be compared to the downlink measurement on the best cell, typically the serving cell 115, for the candidate cell 116 to remain connected to the wireless device 120, or, in other words, before the candidate cell 116 becomes a subject for disconnection from the wireless device 120 and is no longer a subject for soft handover. Thus, when the difference between the downlink measurement on signals in the candidate cell 116 and the downlink measurement on signals in the best cell, typically the serving cell 115, is identified to be outside the range for soft handover, the candidate cell 116 becomes subject for disconnection from the wireless device 120 and is no longer a subject for soft handover.

In order to avoid or reduce the risk of a toggling behaviour of connection/disconnection, a hysteresis may be applied so that e.g. a greater difference in downlink measurements on the serving cell 115 and the candidate cell 116 is required for disconnecting the wireless device 120 from the candidate cell 116 than for connecting the wireless device 120 to the candidate cell 116. Moreover, the range for soft handover may be determined by a threshold value. Hence, for the wireless device 120, serving cell, e.g. the serving cell 115, and candidate cell, e.g. the candidate cell 116, there may be applied a first range for soft handover for determining if the candidate cell 116 shall or shall not be added as a subject for handover, determined by a threshold value ADD, i.e. in the case when there is not already an established connection with the candidate cell 116. There may be applied a second range for soft handover for determining if the candidate cell shall be kept or removed as a subject for handover, determined by a threshold value DEL, i.e. in the case when there is already an established connection with the candidate cell 116. When hysteresis is applied, the first soft handover region is understood to be smaller than the second soft handover region, which corresponds to a case when the threshold value ADD is less than the threshold value DEL.

Typically the first and second soft handover regions are determined based on a first parameter that may be referred to as Reporting Range (RR) and a second parameter that may be referred to as Hysteresis (H). The first and second soft handover regions may thus e.g. correspond, typically with values of the parameters in a decibel scale, to the threshold values of ADD=RR−H/2 and DEL=RR+H/2, respectively. The difference between the ADD and DEL threshold values thus corresponds to the value of H.

In WCDMA/HSPA, downlink measurements for handover purpose are typically quality measurements on e.g. a Common Pilot Channel (CPICH) of the base station serving the cell that is subject to the downlink measurements. The downlink measurements may e.g. be performed with regard to CPICH quality, either ratio (Ec/Io) of Received Signal Code Power (RSCP), to the total wideband power represented by a Received Signal Strength Indicator (RSSI), or signal strength, typically RSCP.

In addition to the actually best cell according to downlink measurements, a wireless device, e.g. the wireless device 120, may add a connection to other cells if their respective downlink measurement is within a certain offset from a downlink measurement on the best cell. The best cell is typically but not necessarily a currently serving cell, e.g. the serving cell 115. The other cells may be referred to as non-serving cells and thus may comprise the candidate cell 116. A so-called active set associated with the wireless device 120 may correspond to all cells to which the wireless device, e.g. the wireless device 120, is connected. This is utilized in soft handover by adding a potentially new serving cell, e.g. the candidate cell 116, to the active set in advance as a non-serving cell. In WCDMA/HSPA it would typically be the RNC 130 that finally decides if the wireless device 120 shall add a new cell or not to the active set, which is accomplished by so called active set update Radio Resource Control (RRC) signalling between the wireless device 120 and the RNC 130. It is also the RNC 130 that decides if an actual handover shall be carried out and also which so-called Reporting Range a user equipment, e.g. the user equipment 120, shall use, which corresponds to the value of the RR parameter discussed above. See e.g. 3GPP TS 25.331 version 11.2.0, Release 11, Section 10.3.7.39 Intra-frequency measurement reporting criteria.

In WCDMA/HSPA, when the candidate cell 116 is not already connected to the wireless device 120 and is thus not in the active set, and the wireless device 120, based on the downlink measurements and the ADD threshold, determines the candidate cell 116 to be within the first soft handover range and thus a subject for soft handover, the wireless device 120 sends an event 1A to the RNC 130. The RNC 130 then typically responds by sending an ACTIVE_SET_UPDATE message to the wireless device 120, and the wireless device 120 establishes a connection with the candidate cell 116 and adds the candidate cell 116 to the active set.

Similarly in WCDMA/HSPA, under assumption that there is an established connection with the candidate cell 116 and that the candidate cell 116 is comprised in the active set, when the wireless device 120 determines, based on the downlink measurements and the DEL threshold, that the candidate cell is outside the second soft handover range and thus no longer shall be a subject for soft handover, the wireless device 120 sends an event 1B to the RNC 130. The RNC 130 then typically responds by sending an ACTIVE_SET_UPDATE message to the wireless device 120, and the wireless device 120 removes the connection to the candidate cell and deletes the candidate cell 116 from the active list.

Still referring to WCDMA/HSPA as an example. When the wireless device 120 determines, based on downlink measurements, that a cell that is not the serving cell 115, e.g. the candidate cell 116, is a better cell, the wireless device may suggest a cell change, i.e. suggest the candidate cell 116 as a new serving cell. The wireless device 120 then sends an event 1D to the RNC 130. It is then up to the RNC to decide if there shall be an actual handover to the candidate cell 116, i.e. so that the candidate cell 116 become a new serving cell. Also the actual handover involves RRC signalling between the wireless device 120 and the RNC 130. It is understood from the above that event 1D in most situations will be generated when a next best cell, e.g. the candidate cell 116, is already in the active set, i.e. when there is already an established connection with the candidate cell 116, and the actual handover thereby may be a soft handover.

In heterogeneous networks, e.g. when the cellular communication network 100 is a heterogeneous network and e.g. the serving cell 115 is a macro cell and the candidate cell 116 is PICO cell, it is desirable to be able to increase the ranges for soft handover range that are applied by the wireless devices, e.g. wireless device 120. In heterogeneous networks there may e.g. be locations when the serving cell 115 provides the best downlink but the candidate cell 116 provides the best uplink. In case of such situation it is desirable to be able to decide which of the cells that shall be the serving cell and thus when to carry out an actual handover while maintaining an active uplink to the cell with the best uplink. Hence it desirable to include regions with such imbalances in the ranges for soft handover. To accomplish this, conventional ranges for soft handover must typically be extended.

One way to achieve this may be by utilizing a so-called Cell Individual Offset (CIO) parameter, see e.g. 3GPP TS 25.331 version 11.2.0, Release 11, Section 14.1.5.3 Cell individual offsets. When a wireless device, e.g., the wireless device 120, perform a downlink measurement on a cell, e.g.

the candidate cell 116, which cell is associated with a CIO, the CIO is added to the downlink measurement on that cell, with the result that event 1A will be triggered earlier provided CIO>0, i.e. the candidate cell 116 may offer a more inferior downlink quality but still being a subject for soft handover and added to the active set.

Figure 2:
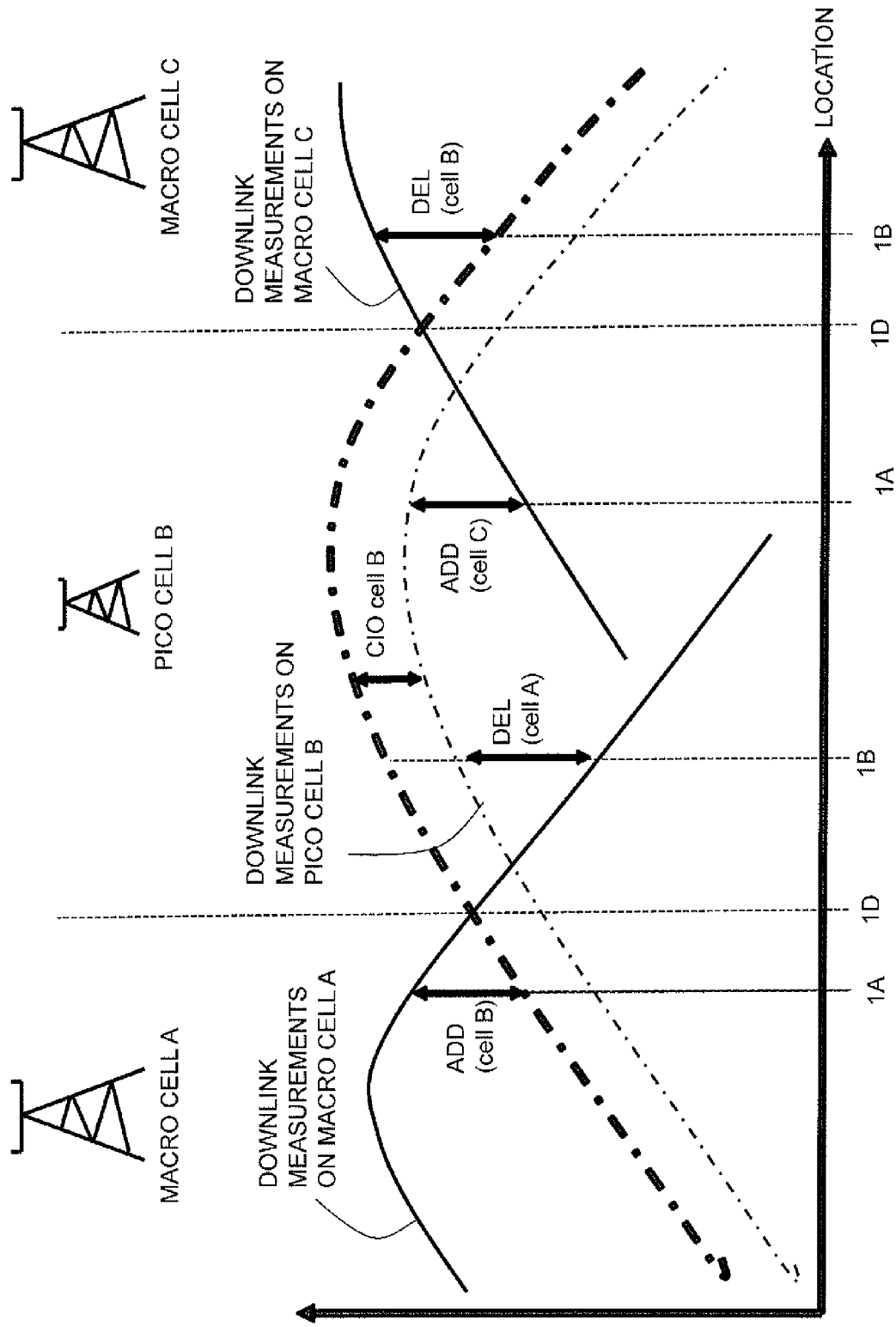
FIG. 2 is a schematic example diagram showing download measurements that decisions relating to handover may be based upon.

FIG. 2 is a schematic example diagram showing downlink measurements that decisions relating to handover may be based upon. What is shown corresponds to a scenario when a wireless device, e.g. the wireless device 120, moves, i.e. changes location from a Macro cell A, to a Pico cell B and then to a Macro cell C, and performs downlink measurements on the cells along the way. The scenario involves changing serving cell, but when the wireless device, e.g. the wireless device 120 is in the Macro cell A, this cell may correspond to the serving cell 115 and the Pico cell B may correspond to the candidate cell 116. In view of what has been described above, the figure should be rather self-explanatory. However, it may be beneficial to explicitly point out some details. Note e.g. that the only CIO in the example is associated with and valid for the Pico cell B. It may further be noted that the CIO is only used, i.e. added to the downlink measurement on Pico cell B for determining if events 1A and 1B shall be triggered, when the Pico Cell B, i.e. the cell with which the CIO is associated, is not the actually best cell according to downlink measurements. In the example, the Pico Cell B is the best cell only in part of the region between the two 1D events shown, to be more exact in the region between the crossing of the lines of downlink measurements on cells A and B, and the crossing of the lines of the downlink measurements on cells B and C. If there would be two separate and typically different CIOs involved, one associated with and valid for the best cell according to the downlink measurements and the other associated with and valid for the other cell that the best cell is compared with, the respective CIO would however typically be added to respective downlink measurement for determining if the event 1D shall be triggered, nevertheless which of the cells would be the actually best cell according to downlink measurements.

Figure 3:
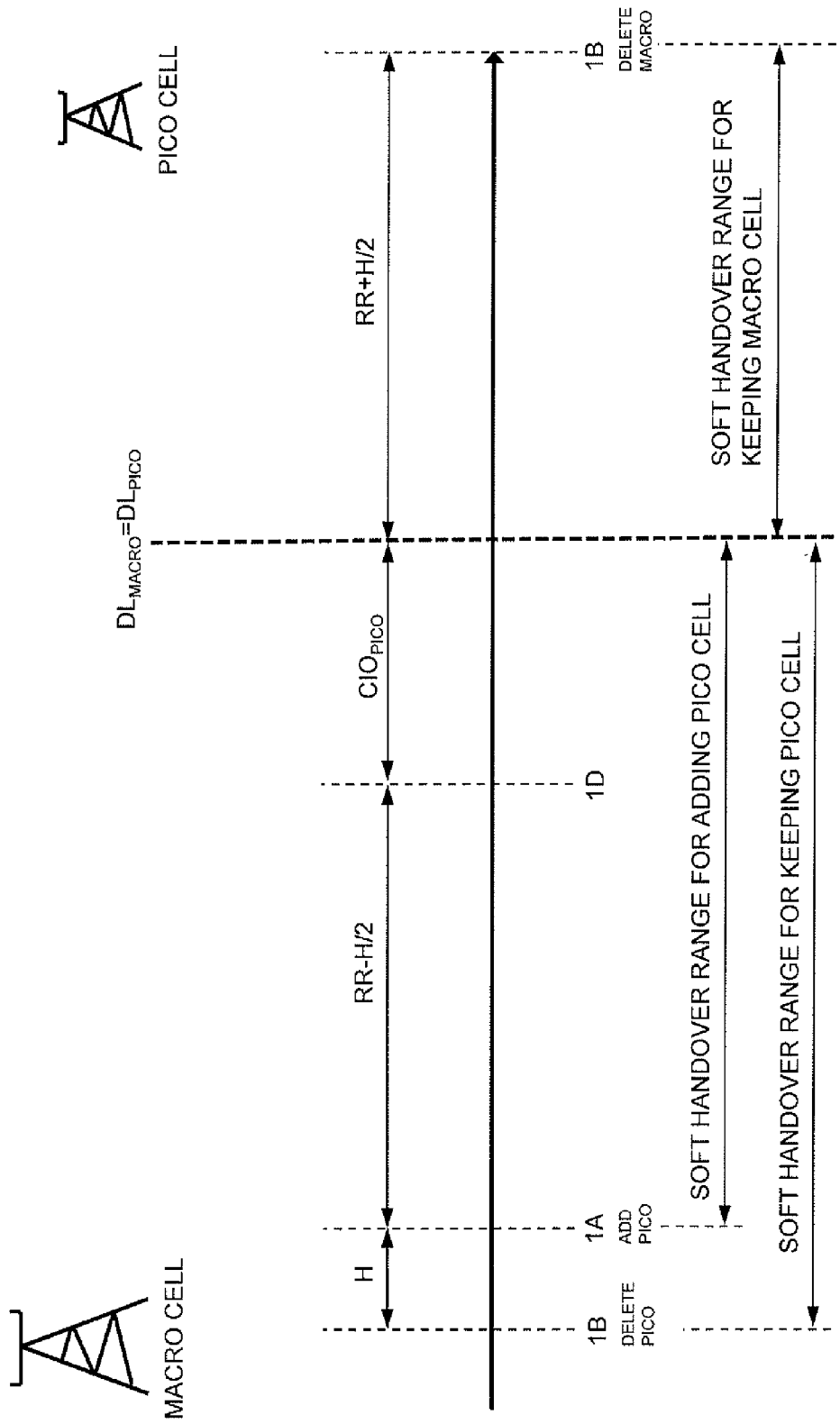
FIG. 3 is a schematic view showing some relations relating to handover, including ranges for soft handover.

FIG. 3 is a schematic view showing some relations relating to handover, including ranges for soft handover. The view illustrates differences in downlink measurements performed by a wireless device, e.g. the wireless device 120, on a Macro cell and a Pico cell and how the parameters, events and thresholds described above relate to this and each other. The macro cell may e.g. be the Macro cell A in the example of FIG. 2 and the Pico cell may e.g. be the Pico Cell B in the example of FIG. 2. The Macro cell may further correspond to the serving cell 115 and the Pico cell may correspond to the candidate cell 116. In view of what has been described above, also this figure should be rather self-explanatory. However, it may here as well be beneficial to explicitly point out some details.

The vertically dotted line $DL_{MACRO}=DL_{PICO}$ is where there is no difference between the actual downlink measurements, i.e. when the downlink measurement on the Macro cell is equal to the downlink measurement on the Pico cell. Hence, to the right of this line the Pico cell offers the best downlink of the two cells and to the left the Macro cell offers the best downlink of the two cells. If there would be no $CIO_{PICO}$, i.e. no CIO is associated with the Pico cell, the event 1D would coincide with the $DL_{MACRO}=DL_{PICO}$ line.

From the figure it is seen that using a CIO have an effect of extending ranges for soft handover, here regarding adding and keeping the Pico cell as a subject for soft handover, and thus an effect of moving events 1A and 1B of the cell the CIO is associated with, here the Pico cell. However, the $CIO_{PICO}$ also has the effect of moving the event 1D which is not always desirable. It may also be noted that what affect the ranges for soft handover regarding the Pico cell are values of the parameters RR, H and the $CIO_{PICO}$. However, as explained above, the H parameter has a special purpose and function, and it may be realized that it is the RR and the $CIO_{PICO}$ that are mainly at hand for use to extend the ranges for soft handover. There may also be a $CIO_{MACRO}$ parameter involved that may be used and that would have a corresponding function as the $CIO_{PICO}$ parameter but be associated with the Macro cell.

It may be further realized that the RR parameter not only affect the soft handover ranges regarding connection to the Pico cell, but also regarding the Macro cell. Only the soft handover range for keeping the Macro cell in the active list as a connected cell is shown in FIG. 3 since it in the shown example is assumed that the wireless device, e.g. wireless device 120, performing the downlink measurements starts from and is being served in the Macro cell and that there thus already is a connection to the Macro cell.

Hence, to conclude, soft handover involves two cells, the serving cell 115 and the candidate cell 116, and it is of interest to be able to extend a range for soft handover involving these two cells. For the two cells there may be one common RR parameter, that is associated with and valid for the combination of the two cells and two CIO parameters, one associated with and valid for the serving cell 115 and one associated with and valid for the candidate base station 116, that are at hand for use, and there is also some intricate relations involved that should be taken into consideration in order to avoid negative side effects that else may occur.

In the following embodiments herein of three different types will be discussed, where each has some unique advantages. However, first some common insights and understandings will be discussed.

Figure 4:
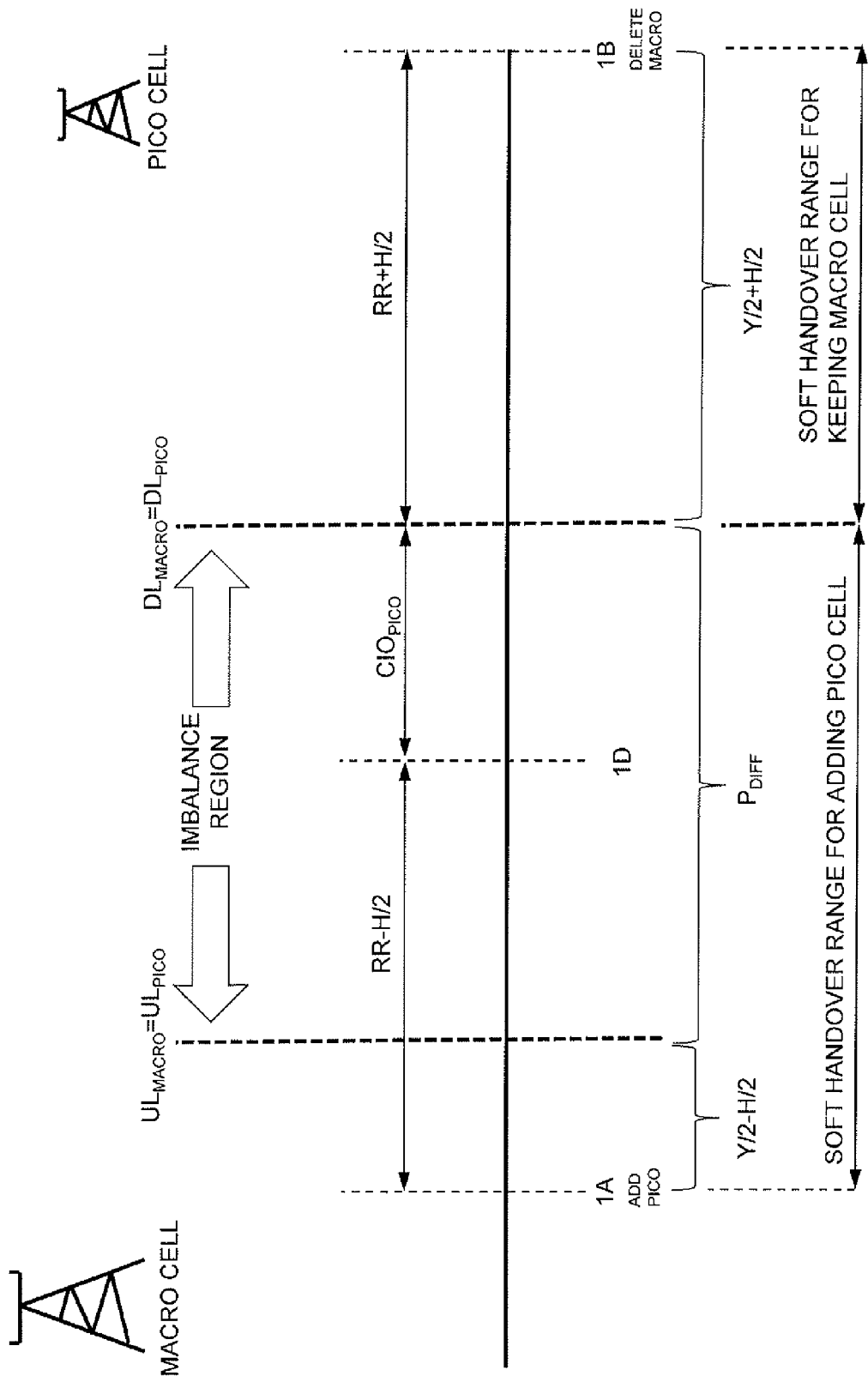
FIG. 4 is yet another schematic view showing relations relating to handover and that shows additional relations relevant for embodiments herein.

FIG. 4 is yet another schematic view showing relations relating to handover and that shows additional relations relevant for embodiments herein and to accomplish desirable extended ranges for soft handover. As for FIG. 3, the Macro cell may e.g. be the Macro cell A in the example of FIG. 2 and the Pico cell may e.g. be the Pico Cell B in the example of FIG. 2. The Macro cell may further correspond to the serving cell 115 and the Pico cell may correspond to the candidate cell 116.

In addition to the dotted line $DL_{MACRO}=DL_{PICO}$, a corresponding vertically dotted line $UL_{MACRO}=UL_{PICO}$ is shown. This line corresponds to where the Macro cell and the Pico cell offers an equally good uplink. In a non-heterogeneous network, the $DL_{MACRO}=DL_{PICO}$ line and the $UL_{MACRO}=UL_{PICO}$ would substantially coincide. However, when there is difference in transmitter power of the cells involved, here the Macro cell and the Pico cell, the lines will separate since the wireless device 120 will transmit with the same power in the uplink to both cells, but receive signals that have been transmitted with different power in the downlink. What is lustrated in FIG. 4 is thus the situation discussed above and in the Background, where, at locations corresponding to differences in downlink measurements that are located between the $DL_{MACRO}=DL_{PICO}$ line and the $UL_{MACRO}=UL_{PICO}$ line, the Macro cell offers the best downlink, but the Pico cell offers the best uplink.

The region, or range, between the $DL_{MACRO}=DL_{PICO}$ line and the $UL_{MACRO}=UL_{PICO}$ line will in the following be referred to as an imbalance region. The imbalance region is thus a region desirable to support with soft handover and thus a region desirable to cover by extended ranges for soft handover that are applied by the wireless device 120.

However, one problem may be that the imbalance region is difficult to identify since the $UL_{MACRO}=UL_{PICO}$ may be difficult to determine since these are based on uplink measurements by two different base stations, here the base stations of the Macro cell and the Pico cell, which may be the serving base station 110 and the candidate base station 111 respectively. The uplink measurements are not directly available to the wireless device 120. Also, there is typically no direct mapping or synchronization available between uplink and downlink measurements, so even the wireless device would be informed, with some delay, about when, based on uplink measurements, a situation corresponding to $UL_{MACRO}=UL_{PICO}$ has occurred, it would be difficult to find out what difference in downlink measurements this would correspond to. It would also have to involve a lot of undesirable signalling, e.g. between the base stations 110, 111, the RNC 130 and the wireless device 120. According to embodiments herein this is solved by assuming that the imbalance region has a width corresponding to a power difference value $P_{DIFF}$ that corresponds to a difference in output power of a respective transmitter of the base stations involved for serving involved cells, here the Macro cell and the Pico cell. There is usually, depending on the location of a user equipment, e.g. the user equipment 120, a difference between paths gains of the to a macro cell, e.g. the Macro cell in FIG. 4, and of the user equipment to a PICO cell, e.g. the Pico cell in FIG. 4. However, a typical case is reciprocal channels, i.e. uplink path gain that is equal to downlink path gain for each user equipment in relation to the involved base stations and positions of the user equipment, or that difference in uplink and downlink path gains is small. In practise, values of $P_{DIFF}$ in a range of about 5 dB to about 20 dB may be expected.

Still referring to FIG. 4, at the lower part, the imbalance region corresponding to $P_{DIFF}$ is shown with some desirable safety margin to the right and to the left. The safety margins on each side has been added adapted to the hysteresis value H when such is applied. However, it is clearly seen that the total safety margin corresponds to a value Y. It is realized that Y should be greater than H, i.e. Y>H, for there to be safety margin to the left when hysteresis is applied.

By comparing the desirable values at the lower part with the parameter relation at the upper part of FIG. 3, the following desirable relations may be derived:

$$RR-H/2+CIO_{PICO}>=P_{DIFF} \quad (r1)$$

and $$RR=Y/2 \quad (r2)$$

$$CIO_{PICO}=P_{DIFF} \quad (r3)$$

Hence, by selecting a value for the RR parameter and a value for the $CIO_{PICO}$ parameter so that relation r1 is fulfilled, it may be ensured that the imbalance region is at least included in the ranges for soft handover applied by the wireless device 120 regarding the Pico cell, e.g. the candidate cell 116. More particularly, by selecting the value of the RR parameter to be Y/2 and the value of the $CIO_{PICO}$ parameter to be $P_{DIFF}$, it may be ensured that the imbalance region is included in the ranges for soft handover applied by the wireless device 120 regarding the Pico cell, e.g. the candidate cell 116, with the desirable safety margin Y/2–H/2 regarding the range for soft handover for adding the Pico cell, e.g. the candidate cell 116. Further, at the same time the value of Y/2 of the RR parameter may ensure that the ranges for soft handover applied by the wireless device 120 regarding the Macro cell, e.g. the serving cell 115, which includes the shown soft handover range for keeping the Macro cell, is not extended more than necessary and e.g. may be kept close to the $DL_{MACRO}=DL_{PICO}$ line. For example, the soft handover range for adding the Macro cell, although not shown in FIG. 3 for not obscuring the view with too many details, is located Y/2–H/2 to the right of the $DL_{MACRO}=DL_{PICO}$ line. Owing to the common RR parameter, undesirable extension of the ranges for soft handover applied by the wireless device 120 regarding the Macro cell may else result as a negative side effect. For example, if the $CIO_{PICO}$ would be set to a zero value, the RR parameter to a value $P_{DIFF}+Y/2$, this would result in desirable soft handover ranges regarding the Pico cell but unnecessary and undesirable large, $P_{DIFF}-H/2$ and $P_{DIFF}+H/2$ soft handover ranges regarding the Macro cell.

It is understood that the exact values of the parameters that have been mentioned may vary between different practical cases and situations. However, just to mention one example fulfilling the relations r2 and r3 above, the value of $P_{DIFF}$ and thus the value of $CIO_{PICO}$ may be 9 dB, the value of H may be 2 dB, the value of Y may be 3 dB and thus the value of RR may be 1.5 dB.

Another negative side effect that remains, even when the relations r2 and r3 are fulfilled, is the event 1D is generated with an offset, here corresponding to $CIO_{PICO}=P_{DIFF}$, and that the event 1D thus may be generated at the $UL_{MACRO}=UL_{PICO}$ line. The offset between where a handover actually occurs, which may be where event 1D is generated, and $DL_{MACRO}=DL_{PICO}$ line may be referred to as a Cell Selection Offset (CSO). As described above, it is desirable to let the RNC 130 decide where in the imbalance region actual handover shall occur. This may be controlled by affecting when the event 1D will be generated by e.g. setting a value of the parameter $CIO_{PICO}$, but here this parameter has already been set to a value for another purpose. It is hence desirable to be able to remove or at least reduce the dependency between events 1A/1B and 1D, which dependency is caused by one or more common parameters, e.g. RR and CIO, that are used for generating these events. The three different types of embodiments herein offers different solutions to this problem, i.e. regarding event 1D, and how to accomplish the desirable ranges for soft handover, i.e. regarding events 1A and 1B.

Figure 5:
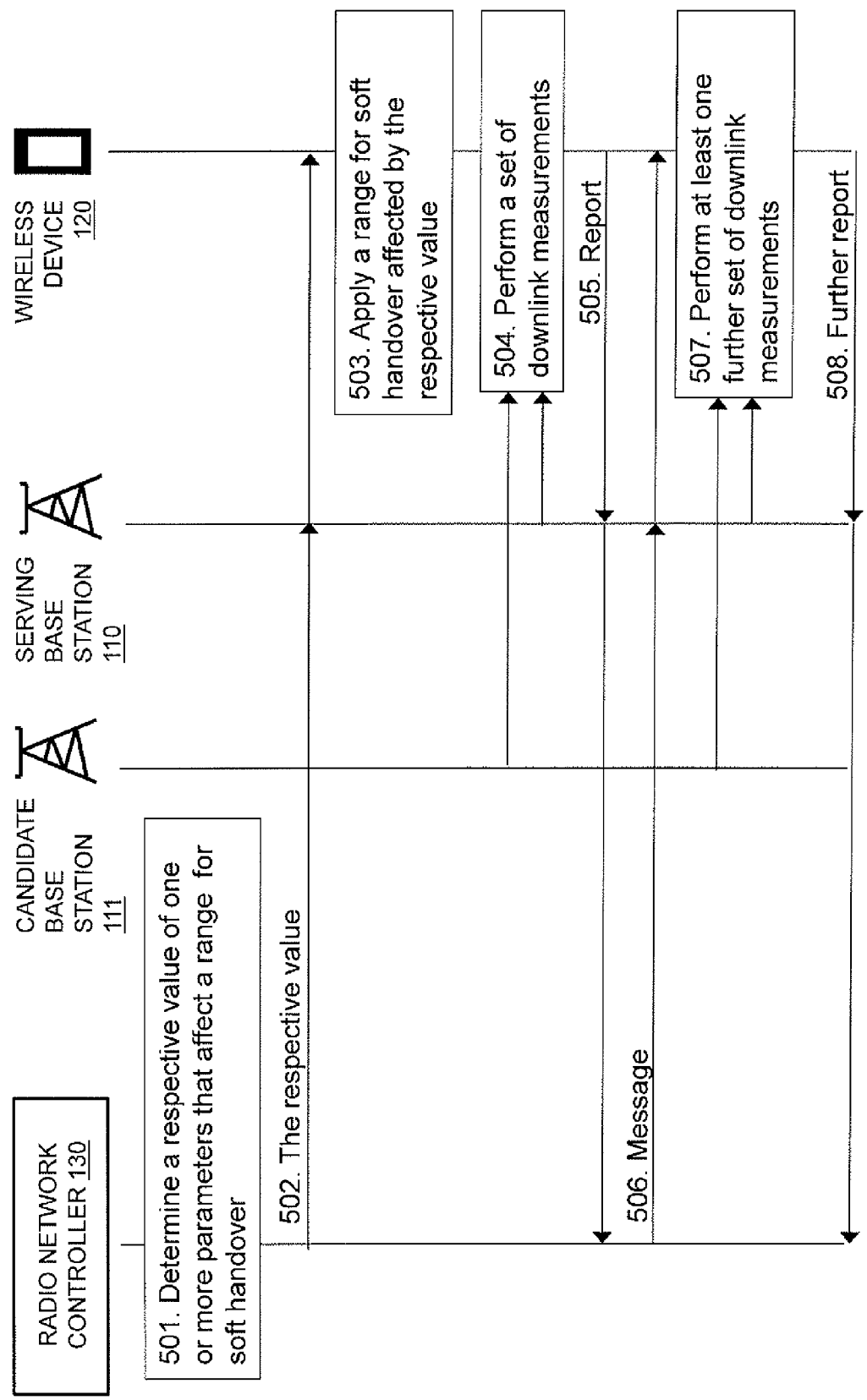
FIG. 5 is a combined signalling diagram and flow chart for illustrating examples of embodiments herein.

Examples of embodiments herein relating to a method in the RNC 131 for supporting a handover of the wireless device 120 from the serving cell 115 to the candidate cell, will now be described with reference to the combined signaling diagram and flowchart depicted in FIG. 5. The actions may be taken in any suitable order.

Action 501

The RNC 130 determines a respective value of one or more parameters for affecting a range for soft handover, e.g. one of the range for soft handover regarding the Pico cell as described above when the Pico cell is the candidate base station 111. The range for soft handover is thus applied by the wireless device 120 to determine if the candidate cell 116 is a subject for soft handover.

For the first type of embodiments, the one or more parameters preferably comprises the RR and the $CIO_{PICO}$ parameters with the values described above.

For the second type of embodiments, the one or more parameters preferably comprises an Extended Soft handover Offset, "ESO", parameter that is separate from any CIO parameter, e.g. $CIO_{PICO}$, that is applied by the wireless device 120 to determine if the candidate cell 116 is a subject for actual handover, and that thus cause generation of event 1D. The second type of embodiments and the ESO parameter will be described in further detail separately below.

For the third type of embodiments, the one or more parameters preferably comprises a first Extended SHO Offset, "$ESO_{SERVING}$", parameter associated with the serving cell 115 and a second Extended Soft handover Offset, "$ESO_{CANDIDATE}$", parameter associated with the candidate cell 116. The third type of embodiments and the $ESO_{SERVING}$ and $ESO_{CANDIDATE}$ parameters will be described in further detail separately below.

Action 502

The RNC 131 provides a sending of the respective value of the one or more parameters to the wireless device 120 that receives the respective value. This is typically accomplished by sending the values of the parameters to the wireless device 120 via one or both of the serving base station 110 and the candidate base station 111. For example, in WCDMA/HSPA, values of RR and CIO parameters are typically sent to the wireless device 120 via the serving base station 110, as already mentioned.

At least one respective value of the one or more parameters is determined based on output power of the transmitter of the serving base station 110 for serving the serving cell 115 and/or of a transmitter of the candidate base station 111 for serving the candidate cell 116.

For the first type of embodiments, the value of the $CIO_{PICO}$ parameter may be $P_{DIFF}$.

For the second and third type of embodiments, the values of the ESO, $ESO_{SERVING}$ and $ESO_{CANDIDATE}$ parameters, may be as described separately below.

Action 503

The wireless device 120 applies the range for soft handover to determine if the candidate cell 116 is a subject for soft handover. The range for soft handover is affected by the respective value of the one or more parameters.

For the first type of embodiments, the wireless device 120 may apply the parameters in a conventional manner but using non-conventional values of the parameters as described above. That is, the first type of embodiments may be compatible with wireless devices, e.g. wireless devices for use in an existing WCDMA/HSPA network, without the need of updating any software or hardware of the wireless devices, which may be referred to as a compatibility with legacy wireless devices.

For the second and third type of embodiments, the wireless device 120 may apply the range for soft handover as described separately below.

Action 504

This action relates to the first type of embodiments. The wireless device 120 performs a set of downlink measurements. The set comprises a downlink measurement on the serving cell 115 and a downlink measurement on the candidate cell 116. The set may thus correspond to the downlink measurements described in the foregoing, which downlink measurements the wireless device 120 performs to determine when to generate events 1A, 1B and 1D.

Action 505

This action relates to the first type of embodiments. The wireless device sends, to the RNC 130 that receives, a report in response to that the wireless device has determined that the set of downlink measurements is associated with the range for soft handover. The report may correspond to what is sent by the wireless device 120 to the RNC 130, via the serving base station 110, when e.g. event 1A is generated as described in the foregoing in connection with FIG. 3 and FIG. 4, i.e. in response to that the wireless device 120 has determined that the downlink measurements are associated with the soft handover range for adding the Pico cell, when the Pico cell is the candidate cell 116.

Action 506

This action relates to the first type of embodiments. The RNC provides, in response to the received report in Action 505, a sending of a message to the wireless device 120 and the wireless device 120 receives the message. The message requests the wireless device 120 to perform one or more further sets of downlink measurements on the serving cell 115 and on the candidate cell 116 and send one or more further reports back in response thereto. Typically the message requests the wireless device 120 to perform the one or more further sets of downlink measurements repeatedly, e.g. periodically. The message may further request the wireless device to repeatedly perform the further sets of downlink measurements as long as the wireless device 120, based on the further downlink measurements, determines that the candidate cell 116 remains a subject for soft handover, or until the RNC 131 instructs otherwise.

In WCDMA/HSPA the message to the wireless device 120 may be accomplished by sending of a "Measurement control" with a periodical reporting criteria.

Action 507

This action relates to the first type of embodiments. The wireless device 120, performs, in response to the received message, said at least one further set downlink measurements. The further set of downlink measurements may as such be performed correspondingly as the set of downlink measurements in Action 504.

Action 508

This action relates to the first type of embodiments. The wireless device 120 sends, in response to the performed at least one further set of downlink measurements, at least one further report back to the RNC 130. The RNC 130 receives the further report. As mentioned above for Action 506, the message may have requested the wireless device 120 to repeatedly perform the further sets of downlink measurements and the wireless device would in the present action, typically repeatedly send, and the RNC 130 repeatedly receive, further reports, typically one for each further set of measurements that have been performed.

Hence, the at least one further report enables the RNC 130 to take a decision regarding an actual handover based on the at least one of said one or more further reports and any event 1D that may be received by the RNC 131 from the wireless device 120 regarding the candidate cell 116 may therefore be ignored by the RNC 130. Negative impact from the previously described undesirable dependency between events 1A/1B and 1D may thus be avoided. The RNC 130 may thus take decision regarding an actual handover when appropriate and the RNC 130, may as described above, by setting values of the one or more parameters, such as RR and $CIO_{PICO}$, have ensured that the actual handover will be a soft handover in the imbalance region. The RNC 130 may thus have more or less full liberty to select when to perform the actual handover by sending a serving cell change command to the wireless device 120. The RNC 130 may decide to perform the actual handover depending on when and to which extent it is desirable to, or needed, to offload the serving cell 115, e.g. in a case when the serving cell 115 is a macro cell and the candidate cell 116 is a PICO cell for offloading the macro cell.

The second type of embodiment will now be described in some further detail.

As mentioned above for Actions 501-503, the second type of embodiments are based on the ESO parameter that may be used in addition to the RR and CIO parameters described in the foregoing. The ESO parameter may replace the CIO parameter with regard to events 1A and 1B, and the CIO parameter may be used as before with regard to event 1D. It is understood that this also have the effect of removing the above described undesirable dependency between events 1A/1B and 1D.

It is realized that values of the ESO parameter and how the wireless device 120 may handle the ESO parameter to accomplish desirable soft handover regions, as described above in connection with FIG. 4, may correspond to the situation described for the first type of embodiments but with $CIO_{PICO}$ replaced by ESO, see for example relations r1-r3 described above. Hence, in some embodiments of the second type, the values of the parameters may be selected so that the following relations are fulfilled:

$$RR-H/2+ESO>=P_{DIFF} \quad (r1')$$

and $$RR=Y/2 \quad (r2')$$

$$ESO=P_{DIFF} \quad (r3')$$

Note that the introduction of the ESO parameter means that an additional parameter has become available for signalling information to the wireless device 120. This corresponds to an increased degree of freedom that may be utilized to make the RNC 130 control the wireless device 120 to accomplish and apply the desirable soft handover regions and when to suggest handover, i.e. to control when the wireless device generates and reports respective event 1A, 1B and 1D, without said undesirable dependency between events 1A/1B and 1D as discussed above.

The ESO parameter may be common for the two cells involved, e.g. the serving cell 115 and the candidate cell 116, and associated with and valid for the combination of the two cells, i.e. similarly as the RR parameter. This e.g. makes it possible for the RNC 130 to send the value of the ESO, e.g. the ESO with an value that is $P_{DIFF}$, to the wireless device 120 only when the two cells involved have been identified as a macro cell and PICO cell and/or when the macro cell is a serving cell, e.g. the serving cell 115, and the PICO cell is a candidate cell, e.g. the candidate cell 116. That is, when a situation has been identified for which it is desirable to extend the ranges for soft handover to comprise the imbalance region as described above.

In some embodiments of the second type, the ESO parameter may instead, similarly as the CIO parameter, be associated with only one of the two cells involved, e.g. only the Pico cell that may correspond to the candidate cell 116.

In some embodiments of the second type the $CIO_{PICO}$ parameter may be set and used as for the first type of embodiments and the additional ESO parameter may be used to generate event 1D instead of any CIO parameter, e.g. he $CIO_{PICO}$. That is, the ESO parameter may be available and controlled by the RNC 130 to accomplish event 1D where it is suitable.

In some embodiments, e.g. of the first or second type, where it is not desirable that any CIO parameter, e.g. $CIO_{PICO}$, shall affect event 1D, an information element "useCIO" may be set to false for event 1D in user equipments, e.g. the user equipment 120. If there is no other parameter, e.g. ESO, that affects event 1D instead, the result will be that event 1D is generated when a new actual best cell is detected based on downlink measurements, i.e. in FIGS. 3 and 4, event 1D would be drawn at the line $DL_{MACRO}=DL_{PICO}$.

Note that the second type of embodiments is compatible with the first type of embodiments and that the first and second type of embodiments may be implemented simultaneously in one and the same network, e.g. the cellular communications network 100.

The value of the ESO parameter may be communicated to the wireless device 120 either through some new designated signalling or by making use of some already existing signalling, so called piggy-backing. In the latter case the value of the ESO may be transmitted by some bits that in existing signalling that are either ignored or that alter behaviour insignificantly of any wireless device that do not support the ESO parameter but that are interpreted as value of the ESO parameter by wireless devices, e.g. the wireless device 120, that support the ESO parameter and the second type of embodiments.

The third type of embodiment will now be described in some further detail.

As mentioned above for Actions 501-503, the third type of embodiments are based on the $ESO_{SERVING}$ and $ESO_{CANDIDATE}$ parameters. The $ESO_{SERVING}$ parameter is associated with the serving cell 115 and based on the output power of the transmitter of the serving base station 110 for serving the serving cell 115. The $ESO_{CANDIDATE}$ parameter is associated with the candidate cell 116 and is based on the output power of the transmitter of the candidate base station 111 for serving the candidate cell 116. The $ESO_{SERVING}$ and $ESO_{CANDIDATE}$ parameters are utilized to make the RNC 130 control the wireless device 120 to accomplish and apply the desirable soft handover regions described above, i.e. to control when the wireless device generates and reports events 1A, 1B.

One advantage with the third type of embodiments is that the RNC 130 is not required to consider the combination of the serving cell 115 and the candidate cell 116. Combining may instead be accomplished by an algorithm in the wireless device 120, see example described below. The respective value of the $ESO_{SERVING}$ and $ESO_{CANDIDATE}$ parameters that are sent by the RNC 130 to the wireless device 120, via one or both of the serving base station 110 and the candidate base station 116, reflects the characteristics of the cell, which cell the parameter is associated with. For example, in some embodiments of the third type, $ESO_{SERVING}$ and $ESO_{CANDIDATE}$ may be set to values according to:

$$ESO_{SERVING}=C_0-P_1, \text{ and}$$

$$ESO_{CANDIDATE}=C_0-P_2,$$

where $C_0$ is a common constant valid for at least the two base stations 110 and 111 (typically $C_0=0$), $P_1$, is a value corresponding to the output power of said transmitter of the serving base station 110 and $P_2$ is a value corresponding to the output power of said transmitter of the candidate base station 111. The constant $C_0$ may further be common for any number of base stations in the network. Note that these and other mathematical expressions in the present disclosure may assume that values in a decibel scale are used, which should be recognized by the skilled person. The respective $ESO_{SERVING}$, $ESO_{CANDIDATE}$ may for the third type of embodiments differ among base stations of the same type due to various factors affecting output power. However, the respective $ESO_{SERVING}$, $ESO_{CANDIDATE}$ for the third type of embodiments is primarily intended to reflect the significant power differences between transmitters of the base stations for serving the cells of the cellular communications network 100 when it is a heterogeneous network.

The wireless device 120 may thus implement an algorithm that modifies the thresholds for events 1A and 1B based on values of the $ESO_{SERVING}$ and $ESO_{CANDIDATE}$ parameters. Generation of events 1A and 1B will be independent on any CIO parameter, that e.g. may be set to a zero value, when the $ESO_{SERVING}$ and $ESO_{CANDIDATE}$ parameters are applied. Furthermore, other soft handover parameters, such as RR and H, may be set to standard values. The $ESO_{SERVING}$ and $ESO_{CANDIDATE}$ parameters may thus alone be used accomplish the desirable soft handover regions described above in combination with standard, or normal, values of RR and H, e.g. such values that typically are used in non-heterogeneous WCDMA/HSPA networks.

Figure 6:
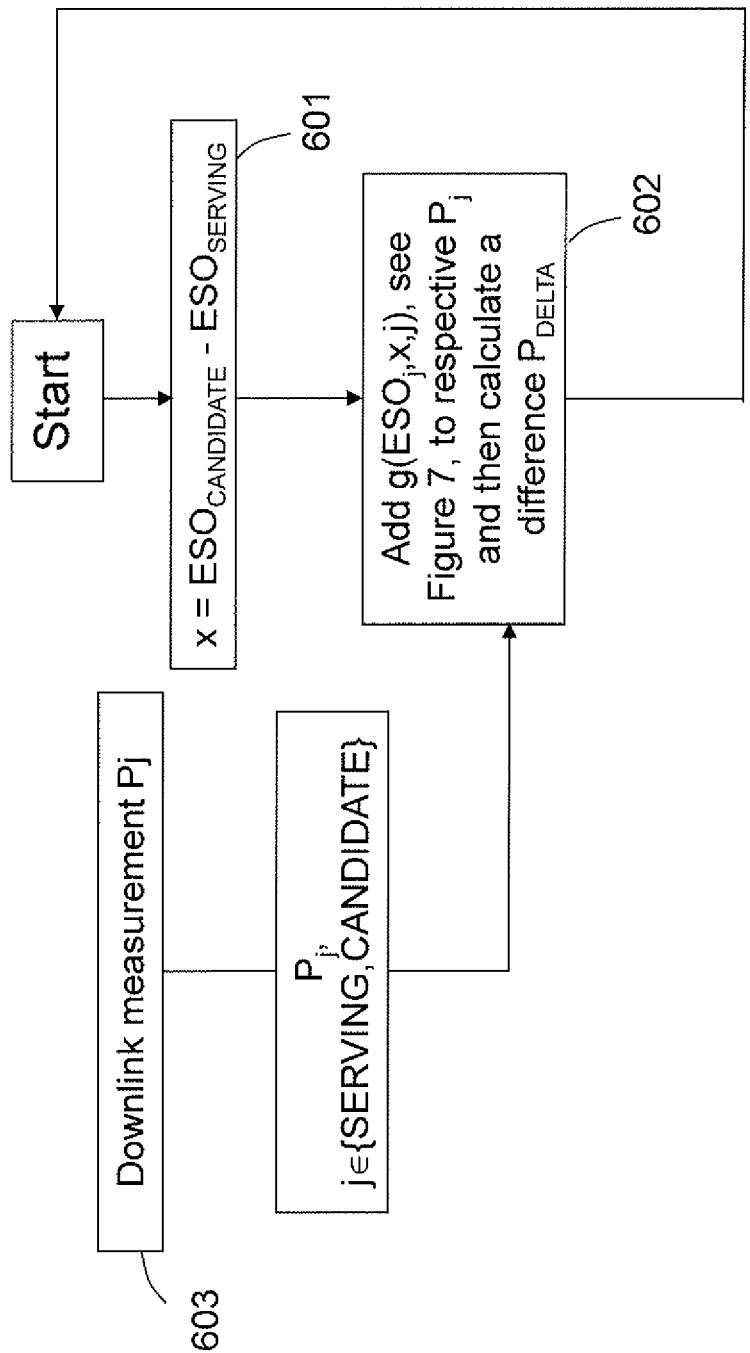
FIG. 6 is a first part of a flow chart illustrating an example of an algorithm that may be implemented in a wireless device according to a third type of embodiments herein.
Figure 7:
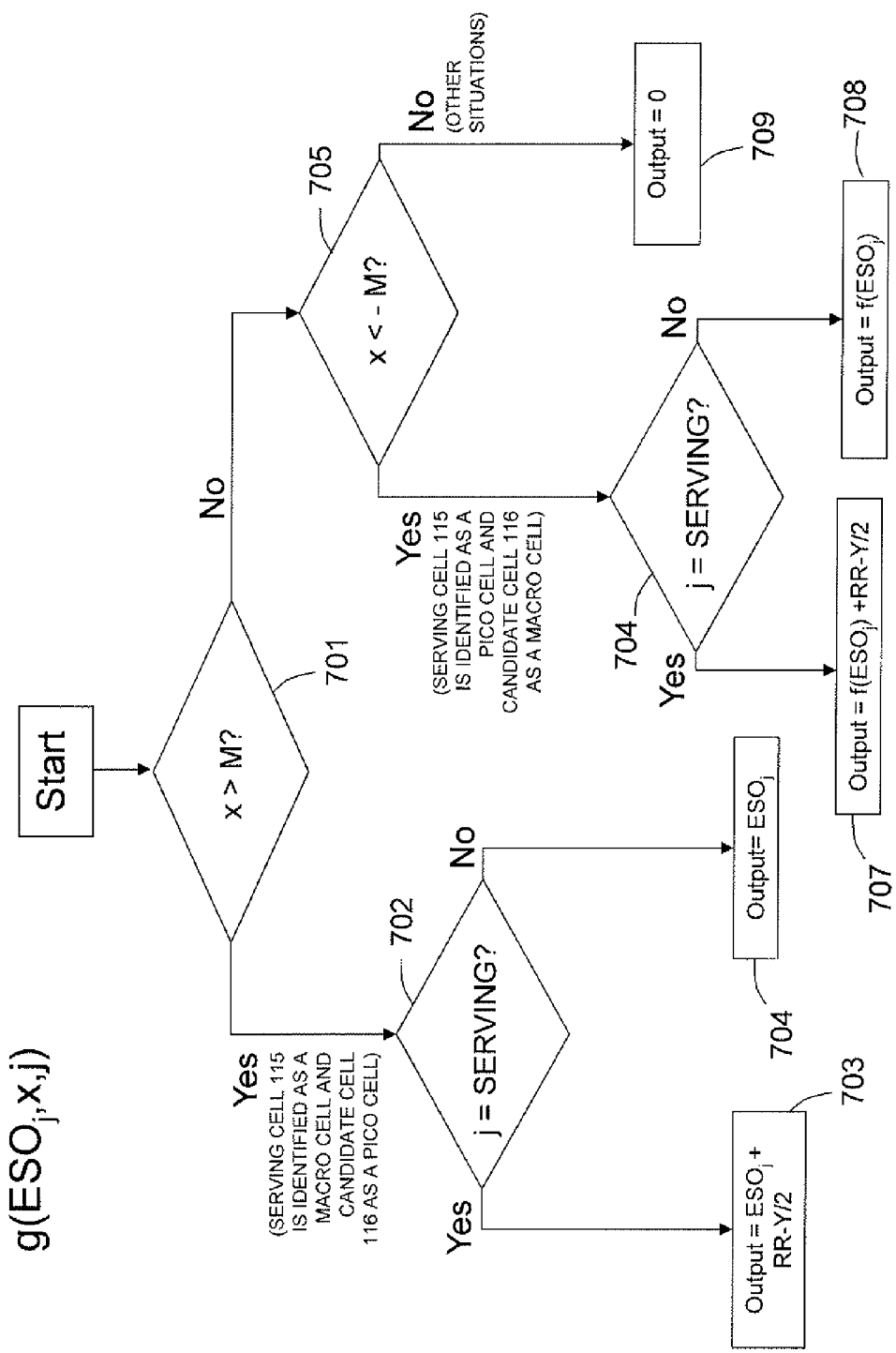
FIG. 7 is a second part of the flow chart shown in FIG. 6.

FIGS. 6 and 7 are flow charts that schematically illustrates an example of an algorithm that may be implemented in the wireless device 120 to make the wireless device 120, according to the third type of embodiments, apply the desirable ranges for soft handover as described above.

Figure 8:
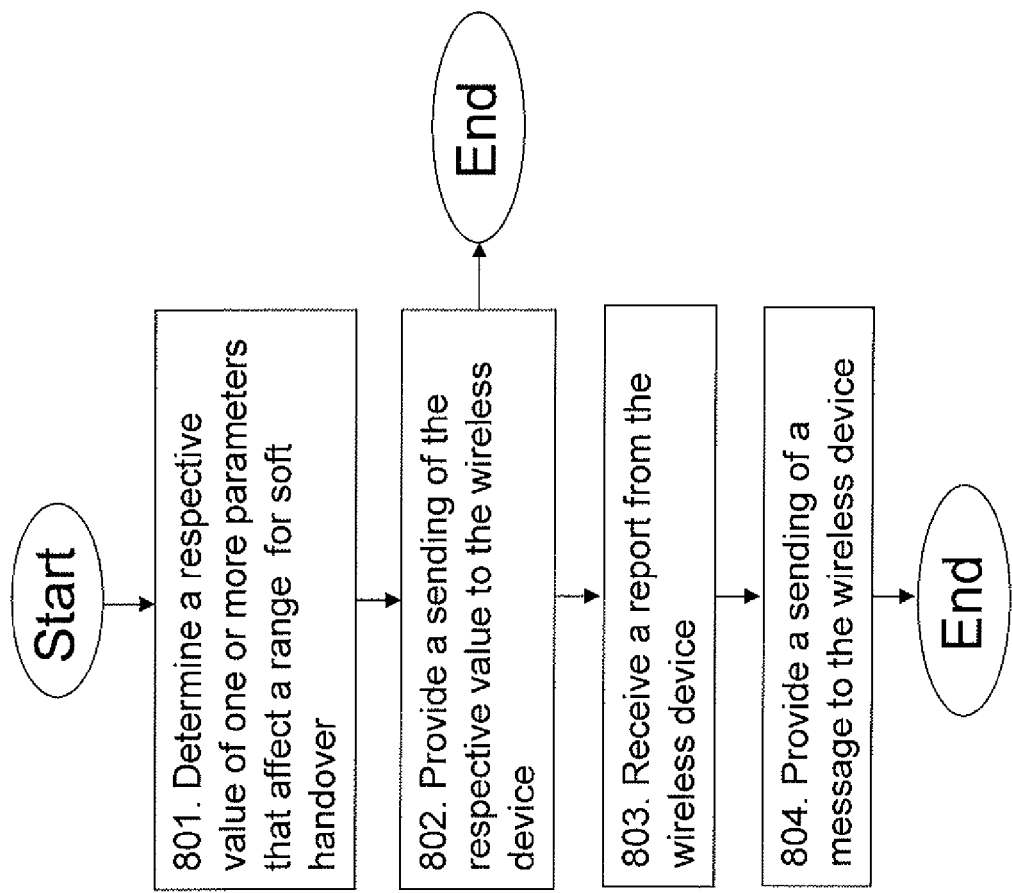
FIG. 8 is a flow chart illustrating a method in a radio network controller according to embodiments herein.

An example extracted from what is shown in FIGS. 7 and 8 will now be described to enhance understanding. Assume as in the examples above that the serving cell 115 is a macro cell, e.g. the Macro cell in FIG. 4, and the candidate cell 116 is a pico cell, e.g. the Pico cell in FIG. 4. The wireless device 120 approaches the pico cell, e.g. the candidate cell 116, that is not in the active set and thus may be relevant for the soft handover range for adding the Pico cell, i.e. adding it to the active list and establish a connection to the Pico cell. According to the algorithm, see box 601 in FIG. 6, the wireless device 120 computes a difference x between the $ESO_{CANDIDATE}$ of the candidate cell 116 that in this example is the non-serving pico cell and the $ESO_{SERVING}$ of the serving cell 115 that in this example is the serving macro cell. The difference x is used by the wireless device 120 to determine which functions g($ESO_j$, x, j) that will be used to calculate a another difference $P_{DELTA}$, see box 602 in FIG. 6. The parameter j enumerates to SERVING and CANDIDATE as shown in FIG. 6, i.e. g($ESO_j$, x, j) may be implemented without having to consider whether the input values are associated with the serving cell 115 or the candidate cell 116. The values returned from g($ESO_j$, x, j) regarding the serving cell 115 and the candidate cell 116 are added to the respective actual downlink measurement Pj, see box 603 of FIG. 6, i.e. the respective downlink measurement on the serving cell 115 and the candidate cell 116, before calculating said difference $P_{DELTA}$ that corresponds to what in the foregoing has been compared to RR/2–H/2 in order to determine whether to add the candidate cell 116 as a subject for handover. The computed difference x is used in g($ESO_j$, x, j), see boxes 701, 702 of FIG. 7, to determine if the serving cell 115 and candidate cell 116 are a macro and PICO cell respectively, based on a value M that is further described below. Since it is this example is assumed that the serving cell 115 is a macro cell and the candidate cell 116 is a pico cell, the output of g($ESO_j$, x, j) will be according to box 703 in FIG. 7 when j is SERVING and according to box 704 when j is CANDIDATE. This follows from that the question in box 701 is answered confirmative both when the serving cell 115 is identified as a macro cell and the candidate cell 116 is identified as a pico cell, but then g($ESO_j$, x, j), see box 702, outputs differently depending on if j is SERVING or CANDIDATE. In the present example the wireless device 120 would thus, according to the illustrated algorithm, calculate the difference $P_{DELTA}$ according to:

$$P_{DELTA}=P_{SERVING}+ESO_{SERVING}+RR-Y/2-(P_{CANDIDATE}+ESO_{CANDIDATE})=P_{SERVING}-P_{CANDIDATE}+RR-Y/2,$$

where $P_{DIFF}$ is the value described in the foregoing. With $ESO_{SERVING}$ and $ESO_{CANDIDATE}$ having values as above. i.e. C0–P1 and C0–P2, it is realized that P1–P2 will correspond to $P_{DIFF}$. The difference $P_{DELTA}$ may then be compared to the ADD threshold RR–H/2 for determining if the downlink measurements are associated with the soft handover range for adding the pico cell, here the candidate cell 116. Hence, it is checked if the following is fulfilled:

$$P_{SERVING}-P_{CANDIDATE}+RR-Y/2<=RR-H/2,$$

which corresponds to $$P_{SERVING}-P_{CANDIDATE}<=P_{DIFF}+Y/2-H/2$$

By comparing this with FIG. 4 it is realized that this corresponds to the desirable soft handover region for adding the pico cell, which thus has been accomplished and will be applied by the wireless device 120. It may similarly be realized that the $ESO_{SERVING}$ and $ESO_{CANDIDATE}$ parameters in combination with the illustrated algorithm, or another similar algorithm, enable the wireless device 120 to apply also the other desirable ranges for soft handover as described above. At the same time, since no CIO parameter is used, the RNC 130 may use CIO parameters, or similar, to control when the wireless device 120 shall generate event 1D, for example, where it is considered suitable to generate it in the imbalance region for a given situation, e.g. in order to offload the serving cell 115 too desirable degree when it is a macro cell and the candidate cell 116 is a pico cell. Hence, also the third type of embodiments enable solving the problems of desirable extension of the ranges for soft handover and the undesirable dependency between events 1A/1B and 1D.

Some further comments will now follow to further enhance understanding of what is shown in the example algorithm of FIGS. 6-7, and of advantages of the third type of embodiments and the $ESO_{SERVING}$, $ESO_{CANDIDATE}$ parameters.

In the function g($ESO_j$, x, j) of FIG. 7, the output is, as mentioned above, decided based on the difference x compared to a threshold value M, see box 701 and box 705 in FIG. 7. The value M may be set to a zero value, but may in some embodiments be set to a non-zero value in order to require a minimum, or significant, difference between values of the $ESO_{SERVING}$ and $ESO_{CANDIDATE}$ parameters before the serving cell 115 and candidate cell 116 are considered to differ significantly enough to be regarded a macro and pico cell respectively and be handled accordingly.

It is seen in FIG. 7 that g($ESO_j$, x, j) also, in a corresponding manner, handles an opposite situation when the serving cell 115 is a pico cell and the candidate cell 116 is macro cell, see boxes 705-708 in FIG. 7. The output according to boxes 707-708 involves a f($ESO_j$) function that e.g. may be set to zero value or a constant value, which will result in the soft handover ranges, Y/2–H/2 and Y/2+H/2, regarding the Macro cell shown in FIG. 4, e.g. in a situation when the serving cell 115 is the pico cell in FIG. 4 and the candidate cell 116 is the Macro cell in FIG. 4. However, it is also possible to apply functions f($ESO_j$) to modify these ranges, typically only slightly.

The function g($ESO_j$, x, j) also handles when the serving cell and the candidate cell are not regarded a macro and pico cell respectively, i.e. when questions according to boxes 701 and 705 are answered with no or in other words when x>=−M and <=M. In this case the $ESO_{SERVING}$ and $ESO_{CANDIDATE}$ parameters are not used and the output of g(ESOj, x, j) is zero, see box 709 in FIG. 7, and the result will thus be then application of non-extended ranges for soft handover, which ranges are RR−H/2 and RR+H/2. That is, standard, or normal, soft handover ranges will be used in situations when the serving cell 115 and the candidate cell 116 are cells served with no or only small power differences.

Note for example that the outputs according to boxes 703 and 707 involve that RR−Y/2 is being added to ESOj and f(ESOj) respectively. This is one of several possible solutions to include RR−Y/2 in the resulting soft handover range. For example, in some embodiments may instead −RR−Y/2 be added to ESOj and f(ESOj) in boxes 704 and 708.

The third type of embodiments and the $ESO_{SERVING}$, $ESO_{CANDIDATE}$ parameters enable flexibility for controlling soft handover ranges applied by the wireless device 120 when the serving cell 115 and the candidate cell 116 are of different types. For example, in case a different, e.g. larger or smaller, extension of soft handover ranges is desired regarding a macro cell that is the candidate cell 116, this may be accomplished by selecting and applying an appropriate function f(ESO), e.g. $f(ESO_{CANDIDATE})=c*ESO_{CANDIDATE}$ by selecting an appropriate constant c.

Similarly as the value of the ESO parameter, the values of the $ESO_{SERVING}$ and $ESO_{CANDIDATE}$ parameters may be sent to the wireless device 120 either through some new designated signalling or by making use of some already existing signalling, so called piggy-backing. In the latter case the respective value of the $ESO_{SERVING}$ and $ESO_{CANDIDATE}$ parameters may be transmitted by some bits that in some already existing signalling are either ignored, or that alter behaviour insignificantly of any wireless device that do not support the $ESO_{SERVING}$ and $ESO_{CANDIDATE}$ parameters, but that are interpreted as values of the $ESO_{SERVING}$ and $ESO_{CANDIDATE}$ parameter by any wireless device, e.g. the wireless device 120, that support these parameters. In some embodiments the value of the $ESO_{SERVING}$ may be sent to the wireless device 120 via the serving base station 110 serving the serving cell 110, i.e. the cell that the $ESO_{SERVING}$ parameter is associated with, and the value of the $ESO_{CANDIDATE}$ parameter may be sent to the wireless device 120 via the candidate base station 111 serving the candidate cell 111, i.e. the cell that the $ESO_{CANDIDATE}$ parameter is associated with.

Embodiments herein relating to a method in the RNC 130, which RNC 130 is an example of a network node, for supporting a handover of the wireless device 120 from the serving cell 115 to the candidate cell 116, will now be further elaborated and described with reference to the flowchart depicted in FIG. 8. The serving cell 115 is served by the serving base station 110. The candidate cell 116 is served by the candidate base station 111. The RNC 130, the serving base station 110 and the candidate base station 111 are comprised in the cellular communications network 100. The method comprises the following actions, which actions may be taken in any suitable order. Further, actions may be combined.

Action 801

The RNC 130 determines a respective value of one or more parameters for affecting a range for soft handover. The range of soft handover is applied by the wireless device 120 to determine if the candidate cell 116 is a subject for soft handover.

At least one respective value of the one or more parameters is determined based on output power of a transmitter of the serving base station 110 for serving the serving cell 115 and/or of a transmitter of the candidate base station 111 for serving the candidate cell 116.

In some embodiments of the first and/or second type, at least one of the respective value of the one or more parameters is determined based on the power difference value $P_{DIFF}$ that corresponds to an output power difference between the transmitter of the serving base station 110 for serving the serving cell 115 and the transmitter of the candidate base station 111 for serving the candidate cell 116.

In some embodiments, the respective value of the one or more parameters are determined so that a region having a width corresponding to the power difference value $P_{DIFF}$ is comprised in the range for soft handover.

In some embodiments of the first type, the one or more parameters comprises a Reporting Range, RR, parameter, and a Cell Individual Offset, CIO, parameter associated with the candidate cell.

Further, in some embodiments of the first type, the RR parameter and the CIO parameter are determined so that the following relation is fulfilled: RR−H/2+CIO>=$P_{DIFF}$, where $P_{DIFF}$>0 is the power difference value and H>=0 is a hysteresis value. The hysteresis value is applied by the wireless device 120 to accomplish two different ranges for soft handover dependent on if the candidate cell 116 shall be added or removed as a subject for soft handover.

Moreover, in some embodiments of the first type, CIO=Pdiff and RR=Y/2, where Y>=H is a value for making the width of the range for soft handover be greater than the power difference value $P_{DIFF}$. It is thereby added a safety margin.

In some embodiment of the second type, the one or more parameters comprises an Extended Soft handover Offset, ESO, parameter that is separate from any parameter, e.g. a CIO parameter, that is applied by the wireless device 120 to determine if the candidate cell 116 is a subject for actual handover.

In some embodiments of the second type, the one or more parameters may further comprise a Reporting Range, RR, parameter, wherein the respective value of the RR parameter and the ESO parameter is determined so that the relation RR−H/2+ESO>=$P_{DIFF}$ is fulfilled. $P_{DIFF}$>0 is the power difference value and H>=0 is a hysteresis value. The hysteresis value is applied by the wireless device 120 to accomplish two different ranges for soft handover dependent on if the candidate cell 116 shall be added or removed as a subject for soft handover.

In some embodiments of the third type, the one or more parameters comprises a first Extended Soft handover Offset, $ESO_{SERVING}$, parameter and a second Extended Soft handover Offset, $ESO_{CANDIDATE}$, parameter. The $ESO_{SERVING}$ parameter is associated with the serving cell 115 and is based on the output power of the transmitter of the serving base station 110 for serving the serving cell 115. The $ESO_{CANDIDATE}$ parameter is associated with the candidate cell 116 and based on the output power of the transmitter of the candidate base station 111 for serving the candidate cell 116.

Further, in some embodiments of the third type, $ESO_{SERVING}=C_0-P_1$ and $ESO_{CANDIDATE}=C_0-P_2$, where $C_0$ is a constant common to at least the two base stations 110 and 111, $P_1$ is a value corresponding to the output power of said transmitter of the serving base station 110 and $P_2$ is a value corresponding to the output power of said transmitter of the candidate base station 111.

This action may correspond fully or partially to the previously described Action 501.

Action 802

The RNC 130 provides sending of the respective value of the one or more parameters to the wireless device 120.

This action may correspond fully or partially to the previously described Action 502.

Action 803

In some embodiments of the first type, the RNC 130 receives, from the wireless device 120, a report sent in response to that the wireless device 120 has determined that a set of downlink measurements performed by the wireless device 120 are associated with the range for soft handover. Said set comprises a downlink measurement $P_{SERVING}$ on the serving cell 115 and a downlink measurement $P_{CANDIDATE}$ on the candidate cell 116.

This action may correspond fully or partially to the previously described Action 505.

Action 804

In some embodiments of the first type, the RNC provides, in response to the received report, a sending of a message to the wireless device 120. The message requests the wireless device 120 to perform one or more further sets of downlink measurements on the serving cell 115 and on the candidate cell 116. The message also requests the wireless device 120 to send one or more further reports back in response to the performed one or more further sets of downlink measurements. The RNC 130 is thereby enabled to take a decision regarding an actual handover based on at least one of said one or more further reports.

This action may correspond fully or partially to the previously described Action 506.

Figure 9:
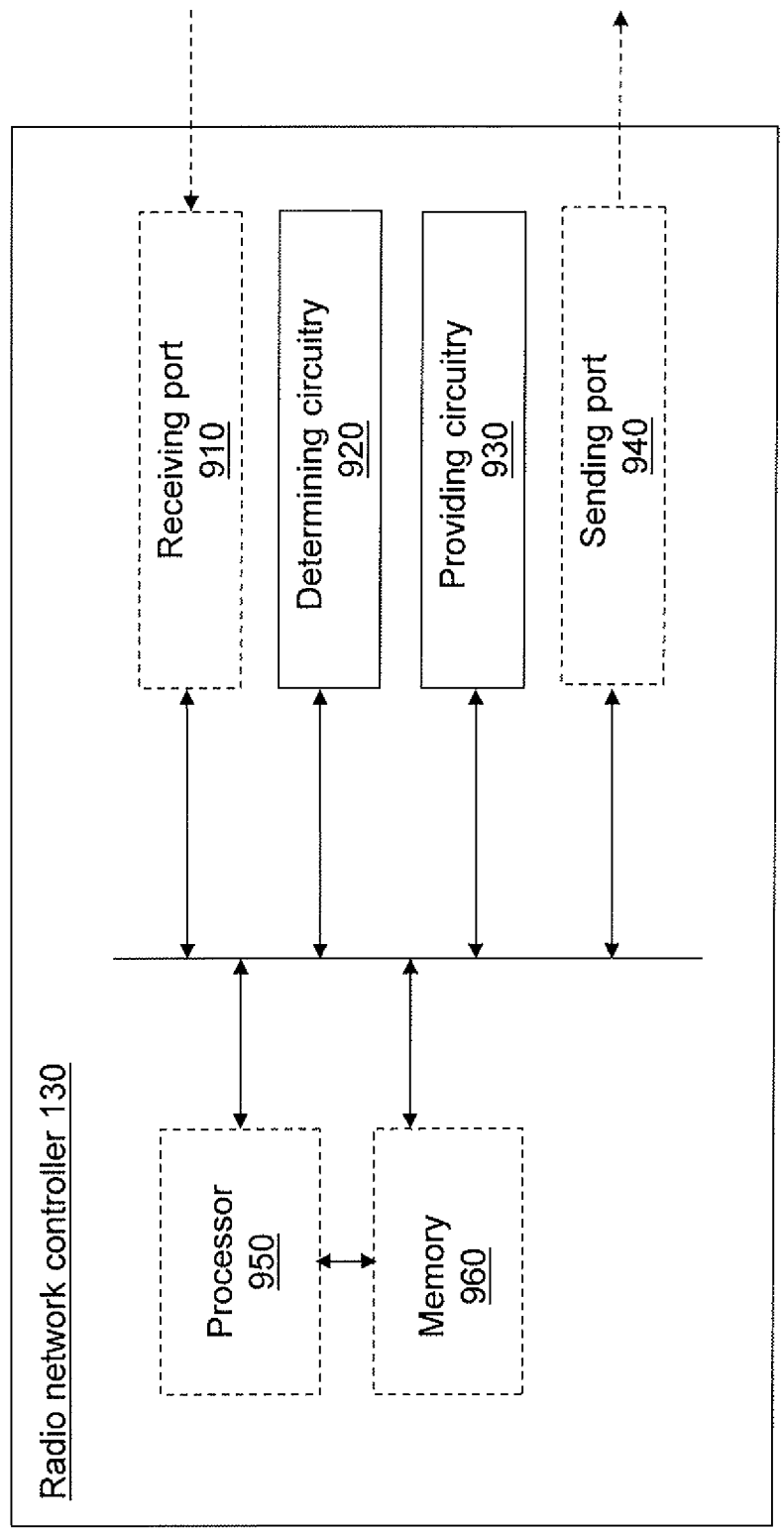
FIG. 9 is a schematic block diagram illustrating a radio network controller according to embodiments herein.

To perform the actions 801-804 above for supporting a handover of the wireless device 120 from the serving cell 115 to the candidate cell 116, the RNC 130 may comprise an arrangement schematically depicted in FIG. 9.

The RNC 130 comprises an determining circuitry 920 configured to determine the respective value of the one or more parameters for affecting a range for soft handover. The range of soft handover is applied by the wireless device 120 to determine if the candidate cell 116 is a subject for soft handover. As mentioned above, at least one respective value of the one or more parameters is determined based on output power of a transmitter of the serving base station 110 for serving the serving cell 115 and/or of a transmitter of the candidate base station 111 for serving the candidate cell 116.

The RNC 130 further comprises a providing circuitry 930 configured to provide the sending of the respective value of the one or more parameters to the wireless device 120.

In some embodiments the providing circuitry 930 is further configured to provide, in response to the report, the sending of the message to the wireless device 120. The message requests the wireless device 120 to perform one or more further sets of downlink measurements on the serving cell 115 and on the candidate cell 116 and send one or more further reports back in response thereto. The RNC 130 is thereby enabled to take a decision regarding an actual handover based on at least one of said one or more further reports.

In some embodiments the RNC 130 comprises a receiving port 910 configured to receive, from the wireless device 120, the report sent in response to that the wireless device 120 has determined that a set of downlink measurements performed by the wireless device 120 are associated with the range for soft handover. Said set comprises a downlink measurement, $P_{SERVING}$, on the serving cell 115 and a downlink measurement, $P_{CANDIDATE}$, on the candidate cell 116. The receiving port 910 may in general be configured to receive information from and be involved in communication with other units, e.g. the serving base station 110 and the candidate base station 111.

The RNC 130 may further comprise a sending port 940 that may be configured to send information to and be involved in communication with other units, e.g. the serving base station 110 and the candidate base station 111. For example, the providing circuitry 930 configured to provide the sending of the respective value of the one or more parameters to the wireless device 120 via the sending port 940.

The embodiments of the RNC 130 may be implemented through one or more processors, such as a processor 950 in the RNC 130 depicted in FIG. 9, together with computer program code for performing the functions and actions of embodiments herein. In some embodiments the circuitry discussed above may be fully or partially implemented by the processor 950.

The computer program code mentioned above may also be provided as a computer program product, for instance in the form of a data carrier carrying computer program code for performing the embodiments herein when being loaded into the in the RNC 130. One such carrier may be in the form of a CD or DVD. It is however feasible with other data carriers such as a memory stick, memory card or hard drive. The computer program code may furthermore be provided as pure program code on a server for download to the RNC 130. The computer program code may furthermore be provided in the form of a data file or files on, or available through, a server for download. The file or files may be executable files for direct or indirect download to and execution on the RNC 130, or may be for intermediate download and compilation to make them executable before download to and for execution in the RNC 130. The server may be accessible over a computer network, such as the Internet, and may e.g. be a web or ftp server.

The RNC 130 may further comprise a memory 960 comprising one or more memory units. The memory 960 is arranged to store data, such as values mentioned above relating to the parameter values and/or the message that may be sent to the wireless device 120, and configurations and/or applications to perform the method when being executed in the RNC 130.

Those skilled in the art will also appreciate that the circuitry and ports 910-940 may refer to a combination of analog and digital circuits, and/or one or more processors configured with software and/or firmware (e.g., stored in memory) that, when executed by the one or more processors such as the processor 950, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 10:
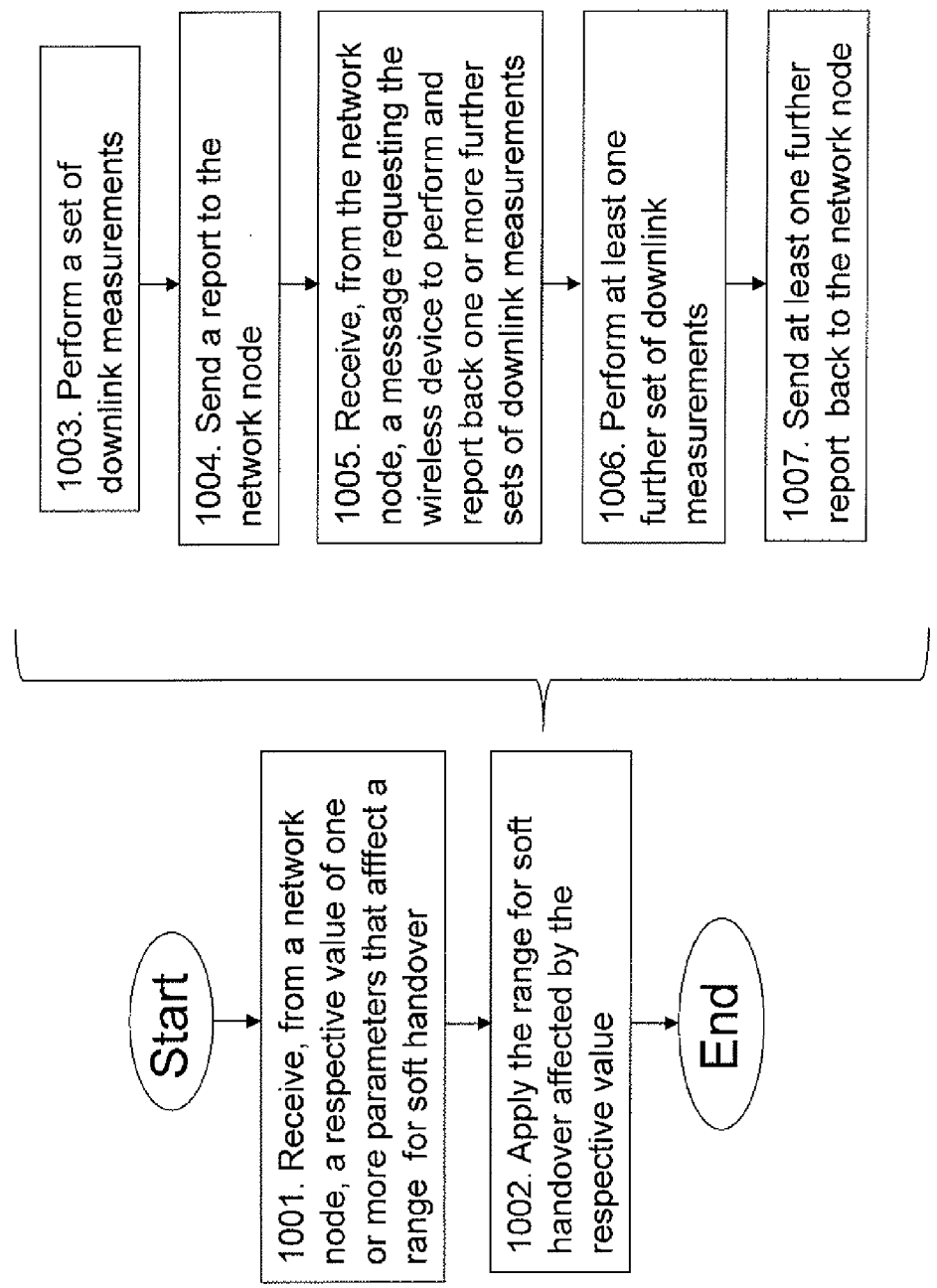
FIG. 10 is a flow chart illustrating a method in a wireless device according to embodiments herein.
Figure 11:
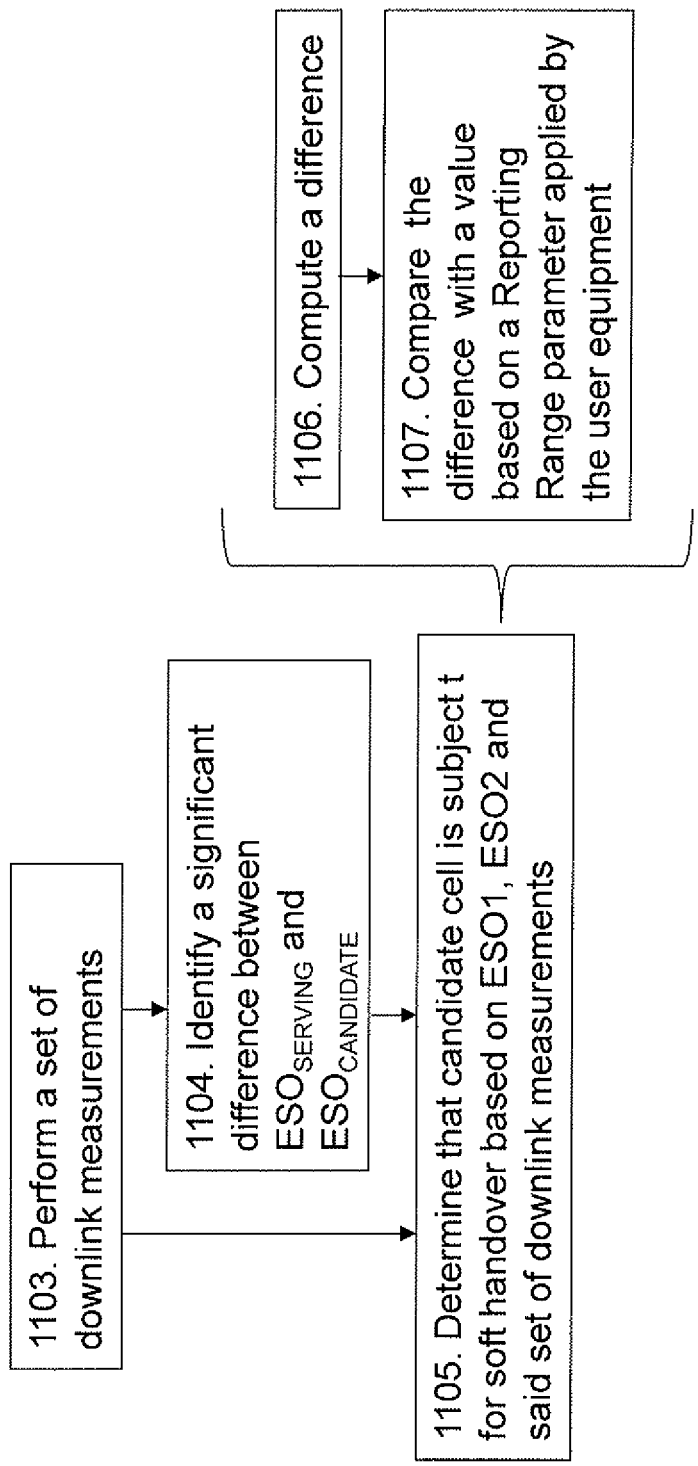
FIG. 11 is a flow chart illustrating a method in a wireless device according to the third type of embodiments herein.

Embodiments herein relating to a method in the wireless device 120 for supporting a handover of the wireless device 120 from the serving cell 115 to the candidate cell 116, will now be further elaborated and described with reference to the flowcharts depicted in FIG. 10 and FIG. 11. The serving cell 115 is served by the serving base station 110. The candidate cell 116 is served by the candidate base station 111. The serving base station 110 and the candidate base station 111 are comprised in the cellular communications network 100. The method comprises the following actions performed by the wireless device 120, which actions may be taken in any suitable order. Further, the actions below may be combined.

Action 1001

The wireless device 120 receives, from the RNC 130 or another network node, via the serving base station 110 and/or via the candidate base station 111, a respective value of one or more parameters that affect a range for soft handover applied by the wireless device 120. At least one respective value of the one or more parameters is determined based on output power of a transmitter of the serving base station 110 for serving the serving cell 115 and/or of a transmitter of the candidate base station 111 for serving the candidate cell 116.

In some embodiments, the respective value of the one or more parameters are determined so that a region having a width corresponding to the power difference value $P_{DIFF}$ is comprised in the range for soft handover.

In some embodiments of the first and/or second type, at least one of the respective value of the one or more parameters is determined based on the power difference value $P_{DIFF}$ that corresponds to an output power difference between the transmitter of the serving base station 110 for serving the serving cell 115 and the transmitter of the candidate base station 111 for serving the candidate cell 116.

In some embodiments of the first type, the one or more parameters comprises a Reporting Range, RR, parameter, and a Cell Individual Offset, CIO, parameter associated with the candidate cell.

Further, in some embodiments of the first type, the RR parameter and the CIO parameter are determined so that the following relation is fulfilled: $RR-H/2+CIO>=P_{DIFF}$, where $P_{DIFF}>0$ is the power difference value and $H>=0$ is a hysteresis value. The hysteresis value is applied by the wireless device 120 to accomplish two different ranges for soft handover dependent on if the candidate cell 116 shall be added or removed as a subject for soft handover.

Moreover, in some embodiments of the first type, $CIO=P_{DIFF}$ and $RR=Y/2$, where $Y>=H$ is a value for making the width of the range for soft handover be greater than the power difference value $P_{DIFF}$. It is thereby added a safety margin.

In some embodiment of the second type, the one or more parameters comprises an Extended Soft handover Offset, ESO, parameter that is separate from any parameter, e.g. a CIO parameter, that is applied by the wireless device 120 to determine if the candidate cell 116 is a subject for actual handover.

In some embodiments of the second type, the one or more parameters may further comprise a Reporting Range, RR, parameter, wherein the respective value of the RR parameter and the ESO parameter is determined so that the relation $RR-H/2+ESO>=P_{DIFF}$ is fulfilled. $P_{DIFF}>0$ is the power difference value and $H>=0$ is a hysteresis value. The hysteresis value is applied by the wireless device 120 to accomplish two different ranges for soft handover dependent on if the candidate cell 116 shall be added or removed as a subject for soft handover.

In some embodiments of the third type, the one or more parameters comprises a first Extended Soft handover Offset, $ESO_{SERVING}$, parameter and a second Extended Soft handover Offset, $ESO_{CANDIDATE}$, parameter. The $ESO_{SERVING}$ parameter is associated with the serving cell 115 and is based on the output power of the transmitter of the serving base station 110 for serving the serving cell 115. The $ESO_{CANDIDATE}$ parameter is associated with the candidate cell 116 and based on the output power of the transmitter of the candidate base station 111 for serving the candidate cell 116.

Further, in some embodiments of the third type, $ESO_{SERVING}=C_0-P_1$ and $ESO_{CANDIDATE}=C_0-P_2$, where $C_0$ is a common constant valid at least for the base stations 110 and 111, $P_1$ is a value corresponding to the output power of said transmitter of the serving base station 110 and $P_2$ is a value corresponding to the output power of said transmitter of the candidate base station 111.

This action may correspond fully or partially to the previously described Action 502.

Action 1002

The wireless device 120 applies the range for soft handover to determine if the candidate cell 116 is a subject for soft handover. The range for soft handover is affected by the respective value of the one or more parameters.

This action may correspond fully or partially to the previously described Action 503.

Action 1003

In some embodiments of the first type, the Action 1002 comprises that the wireless device 120 performs a set of downlink measurements. The set comprises a downlink measurement, $P_{SERVING}$, on the serving cell 115 and a downlink measurement, $P_{CANDIDATE}$, on the candidate cell 116.

This action may correspond fully or partially to the previously described Action 504.

Action 1004

In some embodiments of the first type the Action 1002 further comprises that the wireless device 120 sends, to the RNC 130, a report in response to that the wireless device 120 has determined that the set of downlink measurements is associated with the range for soft handover.

This action may correspond fully or partially to the previously described Action 505.

Action 1005

In some embodiments of the first type the Action 1002 further comprises that the wireless device 120 receives, from the RNC 130, in response to the sending of the report in Action 1004, a message. The message requests the wireless device 120 to perform one or more further sets of downlink measurements on the serving cell 115 and on the candidate cell 116 and to send one or more further reports back in response thereto.

This action may correspond fully or partially to the previously described Action 506.

Action 1006

In some embodiments of the first type the Action 1002 further comprises that the wireless device 120 performs, in response to the received message in Action 1005, at least one further set downlink measurements.

This action may correspond fully or partially to the previously described Action 507.

Action 1007

In some embodiments of the first type the Action 1002 further comprises that the wireless device 120 sends, in response the performed at least one further set of downlink measurements in Action 1006, at least one further report back to RNC 130.

This action may correspond fully or partially to the previously described Action 508.

Action 1101

This action corresponds to Action 1001 mentioned above in the case of said some embodiments of the third type where the one or more parameters comprises the first Extended Soft handover Offset, $ESO_{SERVING}$, parameter and the second Extended Soft handover Offset, $ESO_{CANDIDATE}$, parameter.

Action 1102

This action corresponds to Action 1002 mentioned above in the case of said some embodiments of the third type as mentioned above for Action 1101.

Action 1103

In some embodiments of the third type, the Action 1002 comprises that the wireless device 120 performs a set of downlink measurements, said set comprising a downlink measurement, $P_{SERVING}$, on the serving cell 115 and a downlink measurement, $P_{CANDIDATE}$, on the candidate cell 116.

This action may correspond fully or partially to the previously described algorithm, illustrated in FIG. 6 and FIG. 7, and more particularly to box 603 in FIG. 6.

Action 1104

Furthermore, in some embodiments of the third type, the Action 1002 further comprises that the wireless device 120 identifies a significant difference between the respective values of the $ESO_{SERVING}$ and the $ESO_{CANDIDATE}$ parameters. The wireless device thereby identifies the serving cell 115 and the candidate cell 116 as a pair of macro and pico cells.

This action may correspond fully or partially to the previously described algorithm, illustrated in FIG. 6 and FIG. 7 and discussed above, and more particularly to box 701 and/or 705 in FIG. 7, i.e. where the difference x is compared to value M.

Action 1105

Moreover, in some embodiments of the third type, the Action 1002 further comprises that the wireless device 120 determines, based on the received respective values of the $ESO_{SERVING}$ and $ESO_{CANDIDATE}$ parameters and said set of downlink measurements, that the candidate cell 116 is a subject for soft handover.

In some embodiments the present action is made in response to Action 1104.

Action 1105 may correspond fully or partially to the previously described algorithm, illustrated in FIG. 6 and FIG. 7 and discussed above, and more particularly to box 602 in FIG. 6 in a situation when the calculated difference $P_{DELTA}$ is within RR−H/2 or RR+H/2.

Action 1106

Furthermore, in some embodiments of the third type, the Action 1002, or more particularly Action 1105, comprises that the wireless device 120 computes a difference, $P_{DELTA}$, between a first value and a second value, wherein the first value is based on $ESO_{SERVING}$ and the downlink measurement $P_{SERVING}$ on the serving cell 115 and the second value is based on $ESO_{CANDIDATE}$ and the downlink measurement $P_{CANDIDATE}$ on the candidate cell 116.

Action 1107

Furthermore, in some embodiments of the third type, the Action 1002, or more particularly Action 1105, further comprises that the wireless device 120 compares the difference $P_{DELTA}$ with a value based on a Reporting Range, "RR" parameter applied by the wireless device 120.

Figure 12:
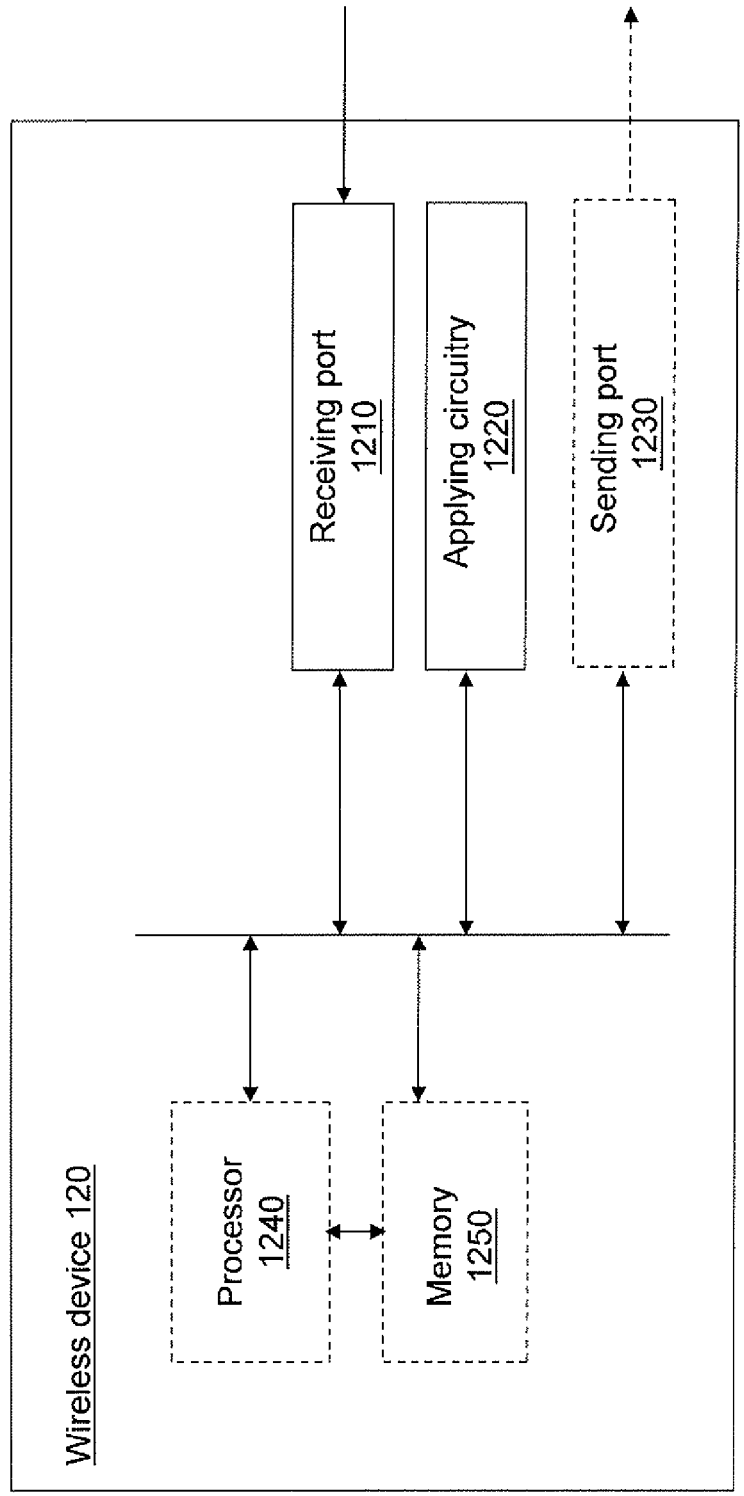
FIG. 12 is a schematic block diagram illustrating a wireless device according to embodiments herein.

To perform the actions 1001-1007 and 1101-1107 above for supporting a handover of the wireless device 120 from the serving cell 115 to the candidate cell 116, the wireless device 120 may comprise an arrangement schematically depicted in FIG. 12.

The wireless device 120 comprises a receiving port 1210 configured to receive, from the RNC 130, via the serving base station 110 and/or via the candidate base station 111, the respective value of one or more parameters that affect a range for soft handover applied by the wireless device 120. At least one respective value of the one or more parameters is determined based on output power of the transmitter of the serving base station 110 for serving the serving cell 115 and/or of the transmitter of the candidate base station 111 for serving the candidate cell 116.

The receiving port 1210 may be further configured to in general receive information from and be involved in communication with other units, e.g. the serving base station 110 and the candidate base station 111.

The wireless device 120 further comprises an applying circuitry 1220 configured to apply the range for soft handover to determine if the candidate cell 116 is a subject for soft handover. The range for soft handover is affected by the respective value of the one or more parameters.

In some embodiments, the applying circuitry 1220 is further configured to perform the set of downlink measurements, said set comprises, as mentioned above, the downlink measurement, $P_{SERVING}$, on the serving cell 115 and the downlink measurement, $P_{CANDIDATE}$, on the candidate cell 116.

In some embodiments, the applying circuitry 1220 is further configured to, based on the received respective values of the $ESO_{SERVING}$ and $ESO_{CANDIDATE}$ parameters and said set of downlink measurements, determine that the candidate cell 116 is a subject for soft handover.

In some embodiments, the applying circuitry 1220 is further configured to identify the significant difference between the respective values of the $ESO_{SERVING}$ and the $ESO_{CANDIDATE}$ parameters. Thereby the wireless device 120 identifies the serving cell 115 and the candidate cell 116 as a pair of macro and pico cells. The applying circuitry 1220 may be further configured to determine, in response to the identified significant difference, that the candidate cell 116 is a subject for soft handover.

In some embodiments, the applying circuitry 1220 is further configured to compute the difference, $P_{DELTA}$, between the first value and the second value. The first value is based on $ESO_{SERVING}$ and the downlink measurement $P_{SERVING}$ on the serving cell 115. The second value is based on $ESO_{CANDIDATE}$ and the downlink measurement $P_{CANDIDATE}$ on the candidate cell 116. The applying circuitry 1220 may be further configured to compare the difference $P_{DELTA}$ with the value based on the Reporting Range, "RR" parameter applied by the wireless device 120.

The RNC 130 may further comprise a sending port 1230 that may be configured to send information to and be involved in communication with other units, e.g. the serving base station 110 and the candidate base station 111.

The embodiments of the wireless device 120 may be implemented through one or more processors, such as a processor 1240 in the wireless device 120 depicted in FIG. 12, together with computer program code for performing the functions and actions of embodiments herein. In some embodiments the circuitry discussed above may be fully or partially implemented by the processor 1240.

The computer program code mentioned above may also be provided as a computer program product, for instance in the form of a data carrier carrying computer program code for performing the embodiments herein when being loaded into the in the wireless device 120. One such carrier may be in the form of a CD or DVD. It is however feasible with other data carriers such as a memory stick, memory card or hard drive. The computer program code may furthermore be provided as pure program code on a server for download to the wireless device 120. The computer program code may furthermore be provided in the form of a data file or files on, or available through, a server for download. The file or files may be executable files for direct or indirect download to and execution on the wireless device 120, or may be for intermediate download and compilation to make them executable before download to and for execution in the wireless device 120. The server may be accessible over a computer network, such as the Internet, and may e.g. be a web or ftp server.

The wireless device 120 may further comprise a memory 1250 comprising one or more memory units. The memory 1250 is arranged to store data, such as values mentioned above relating to the parameter values and/or the reports that may be sent to the wireless device 120, and configurations and/or applications to perform the method when being executed in the wireless device 120.

Those skilled in the art will also appreciate that the circuitry and ports 1210-1230 may refer to a combination of analog and digital circuits, and/or one or more processors configured with software and/or firmware (e.g., stored in memory) that, when executed by the one or more processors such as the processor 1240, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Many embodiments and examples that have been described and discussed herein relate to UMTS and HSPA. However, this is not to be construed as limiting embodiments herein to only UMTS and HSPA based cellular communications networks.

Generally, embodiments herein are not limited to the above described features and details. Various alternatives, modifications and equivalents may be used. Therefore, the above embodiments should not be taken as limiting the scope of the invention, which is defined by the appending claims.

When using the word "comprise" or "comprising" it shall be interpreted as non-limiting, i.e. meaning "consist at least of".

The invention claimed is:

1. A method in a network node for supporting a handover of a wireless device from a serving cell being served by a serving base station to a candidate cell being served by a candidate base station, the network node, the serving base station and the candidate base station being comprised in a cellular communications network, wherein the method comprises:

determining a respective value of one or more parameters for a range for soft handover, the range of soft handover being used by the wireless device to determine if the candidate cell is available for soft handover, wherein at least one respective value of the one or more parameters is determined based on:

output power of a transmitter of the serving base station for serving the serving cell and/or of a transmitter of the candidate base station for serving the candidate cell; and a power difference value (PDIFF) that corresponds to an output power difference between said transmitters and the parameters comprise the following parameters:

a Reporting Range, "RR", parameter; and a Cell Individual Offset, "CIO", parameter associated with the candidate cell where the RR parameter and the CIO parameter are determined so that the following relation is fulfilled:

$$RR\text{-}H/2\text{+}CIO\text{>}=PDIFF,$$

wherein PDIFF>0 is the power difference value, and wherein H>=0 is a hysteresis value applied by the wireless device to accomplish two different ranges for soft handover dependent on if the candidate cell shall be added or removed as a subject for soft handover;

sending the respective value of the one or more parameters to the wireless device.

2. The method as claimed in claim 1, wherein the respective values of the one or more parameters are determined so that a region having a width corresponding to the power difference value (PDIFF) is comprised in the range for soft handover, the power difference value (PDIFF) corresponding to the output power difference between said transmitters.

3. The method as claimed in claim 1, wherein the method further comprises:

receiving, from the wireless device, a report sent in response to the wireless device determining that a set of downlink measurements performed by the wireless device are associated with the range for soft handover, said set comprising a downlink measurement (PSERVING) on the serving cell and a downlink measurement (PCANDIDATE) on the candidate cell, and providing, in response to the report, a sending of a message to the wireless device, the message requesting the wireless device to perform one or more further sets of downlink measurements on the serving cell and on the candidate cell and send one or more further reports back in response thereto, thereby enabling the network node to make a decision regarding an actual handover based on at least one of said one or more further reports.

4. The method as claimed in claim 1, wherein $$CIO=P\text{diff, and}$$

$$RR=Y/2,$$

wherein Y>=H, is a value for making the width of the range for soft handover be greater than the power difference value (PDIFF) and thereby adding a safety margin.

5. A method in a network node for supporting a handover of a wireless device from a serving cell being served by a serving base station to a candidate cell being served by a candidate base station, the network node, the serving base station and the candidate base station being comprised in a cellular communications network, wherein the method comprises:

determining a respective value of one or more parameters for a range for soft handover, the range of soft handover being used by the wireless device to determine if the candidate cell is available for soft handover, wherein at least one respective value of the one or more parameters is determined based on:

output power of a transmitter of the serving base station for serving the serving cell and/or of a transmitter of the candidate base station for serving the candidate cell; and a power difference value (PDIFF) that corresponds to an output power difference between said transmitters and the parameters comprise:

an Extended Soft handover Offset, "ESO", parameter that is separate from any parameter that is applied by the wireless device to determine if the candidate cell is a subject for actual handover; and a Reporting Range, "RR", parameter, wherein the respective value of the RR parameter and the ESO parameter is determined so that the following relation is fulfilled:

$RR-H/2+ESO>=PDIFF;$ wherein PDIFF>0 is the power difference value; and wherein H>=0 is a hysteresis value applied by the wireless device to accomplish two different ranges for soft handover dependent on if the candidate cell shall be added or removed as a subject for soft handover; and sending the respective value of the one or more parameters to the wireless device.

6. The method as claimed in claim 1, wherein the one or more parameters comprises:

a first Extended Soft handover Offset, "ESOSERVING", parameter associated with the serving cell and based on the output power of the transmitter of the serving base station for serving the serving cell, and a second Extended Soft handover Offset, "ESOCANDIDATE", parameter associated with the candidate cell and based on the output power of the transmitter of the candidate base station for serving the candidate cell.

7. The method as claimed in claim 6, wherein ESOSERVING=C0−P1, and ESOCANDIDATE=C0−P2, wherein C0 is a common constant valid for the serving base station and the candidate base station, P1 is a value corresponding to the output power of said transmitter of the serving base station and P2 is a value corresponding to the output power of said transmitter of the candidate base station.

8. A method in a wireless device for supporting a handover of the wireless device from a serving cell being served by a serving base station to a candidate cell being served by a candidate base station, the serving base station and the candidate base station being comprised in a cellular communications network, wherein the method comprises:

receiving, from a network node via the serving base station and/or via the candidate base station, a respective value of one or more parameters for a range for soft handover used by the wireless device, wherein at least one respective value of the one or more parameters is determined based on:

output power of a transmitter of the serving base station for serving the serving cell and/or of a transmitter of the candidate base station for serving the candidate cell; and a power difference value (PDIFF) that corresponds to an output power difference between the transmitter of the serving base station for serving the serving cell and the transmitter of the candidate base station for serving the candidate cell and the parameters comprise one the following parameters:

a Reporting Range, "RR", parameter; and a Cell Individual Offset, "CIO", parameter associated with the candidate cell where the RR parameter and the CIO parameter are determined so that the following relation is fulfilled:

$RR-H/2+CIO>=PDIFF;$ wherein PDIFF>0 is the power difference value; and wherein H>=0 is a hysteresis value applied by the wireless device to accomplish two different ranges for soft handover dependent on if the candidate cell shall be added or removed as a subject for soft handover; and applying the range for soft handover to determine if the candidate cell is a subject for soft handover, which range for soft handover is affected by the respective value of the one or more parameters.

9. The method as claimed in claim 8, wherein the respective value of the one or more parameters is determined so that a region having a width corresponding to the power difference value (PDIFF) is comprised in the range for soft handover, the power difference value (PDIFF) corresponding to the output power difference between said transmitters.

10. The method as claimed in claim 8, wherein the applying of the range for soft handover to determine if the candidate cell is a subject for soft handover comprises:

performing a set of downlink measurements, said set comprising a downlink measurement (PSERVING) on the serving cell and a downlink measurement (PCANDIDATE) on the candidate cell, and sending, to the network node, a report in response to the wireless device determining that the set of downlink measurements is associated with the range for soft handover, receiving, from the network node in response to the sending of the report, a message requesting the wireless device to perform one or more further sets of downlink measurements on the serving cell and on the candidate cell and send one or more further reports back in response thereto, performing, in response to the received message, at least one further set of downlink measurements, and sending, in response to the performed at least one further set of downlink measurements, at least one further report back to the network node.

11. The method as claimed in claim 8, wherein $CIO=PDIFF,$ and $RR=Y/2,$ wherein Y>=H is a value for making the width of the range for soft handover be greater than the power difference value (PDIFF) and thereby adding a safety margin to the range for soft handover.

12. A method in a wireless device for supporting a handover of the wireless device from a serving cell being served by a serving base station to a candidate cell being served by a candidate base station, the serving base station and the candidate base station being comprised in a cellular communications network, wherein the method comprises:

receiving, from a network node via the serving base station and/or via the candidate base station, a respective value of one or more parameters for a range for soft handover used by the wireless device, wherein at least one respective value of the one or more parameters is determined based on:

output power of a transmitter of the serving base station for serving the serving cell and/or of a transmitter of the candidate base station for serving the candidate cell; and a power difference value (PDIFF) that corresponds to an output power difference between the transmitter of the serving base station for serving the serving cell and the transmitter of the candidate base station for serving the candidate cell and the parameters comprise one the following parameters:
  an Extended Soft handover Offset, "ESO", parameter that is separate from any parameter that is applied by the wireless device to determine if the candidate cell is a subject for actual handover;
  a Reporting Range, "RR", parameter, wherein the respective value of the RR parameter and the ESO parameter is determined so that the following relation is fulfilled:

$$RR-H/2+ESO>=PDIFF;$$

wherein PDIFF>0 is the power difference value; and
    wherein H>=0 is a hysteresis value applied by the wireless device to accomplish two different ranges for soft handover dependent on if the candidate cell shall be added or removed as a subject for soft handover;
  applying the range for soft handover to determine if the candidate cell is a subject for soft handover, which the range for soft handover is affected by the respective value of the one or more parameters.

13. The method as claimed in claim 8, wherein the one or more parameters comprises:
  a first Extended Soft handover Offset, "ESOSERVING", parameter associated with the serving cell and based on the output power of the transmitter of the serving base station for serving the serving cell, and
  a second Extended Soft handover Offset, "ESOCANDIDATE", parameter associated with the candidate cell and based on the output power of the transmitter of the candidate base station for serving the candidate cell.

14. The method as claimed in claim 13, wherein ESOSERVING=C0−P1, and ESOCANDIDATE=C0−P2, wherein C0 is a common constant valid for the serving base station and the candidate base station, P1 is a value corresponding to the output power of said transmitter of the serving base station and P2 is a value corresponding to the output power of said transmitter of the candidate base station.

15. The method as claimed in claim 13, wherein the applying of the range for soft handover to determine if the candidate cell is a subject for soft handover comprises:
  performing a set of downlink measurements, said set comprising a downlink measurement (PSERVING) on the serving cell and a downlink measurement (PCANDIDATE) on the candidate cell,
  determining, based on the received respective values of the ESOSERVING and ESOCANDIDATE parameters and said set of downlink measurements, that the candidate cell is a subject for soft handover.

16. The method as claimed in claim 15, wherein the applying of the range for soft handover to determine if the candidate cell is a subject for soft handover further comprises:
  identifying a significant difference between the respective values of the ESOSERVING and the ESOCANDIDATE parameters, thereby identifying the serving cell and the candidate cell as a pair of macro and pico cells, and wherein
  the determining that the candidate cell is a subject for soft handover is made in response to the identified significant difference.

17. The method as claimed in claim 15, wherein the determining that the candidate cell is a subject for soft handover comprises:
  computing a difference (PDELTA) between a first value and a second value, wherein the first value is based on ESOSERVING and the downlink measurement (PSERVING) on the serving cell and the second value is based on ESOCANDIDATE and the downlink measurement (PCANDIDATE) on the candidate cell, and
  comparing the difference (PDELTA) with a value based on a Reporting Range, "RR" parameter applied by the wireless device.

18. A network node for supporting a handover of a wireless device from a serving cell being served by a serving base station to a candidate cell being served by a candidate base station, the network node, the serving base station and the candidate base station being comprised in a cellular communications network, wherein the network node comprises:
  first circuitry determining a respective value of one or more parameters for a range for soft handover, the range of soft handover being used applied by the wireless device to determine if the candidate cell is available for soft handover, wherein at least one respective value of the one or more parameters is determined based on:
    output power of a transmitter of the serving base station for serving the serving cell and/or of a transmitter of the candidate base station for serving the candidate cell; and
    a power difference value (PDIFF) that corresponds to an output power difference between the transmitter of the serving base station for serving the serving cell and the transmitter of the candidate base station for serving the candidate cell and the parameters comprise the following parameters:
    a Reporting Range, "RR", parameter; and
    a Cell Individual Offset, "CIO", parameter associated with the candidate cell where the RR parameter and the CIO parameter are determined so that the following relation is fulfilled:

$$RR-H/2+CIO>=PDIFF,$$

wherein PDIFF>0 is the power difference value, and
    wherein H>=0 is a hysteresis value applied by the wireless device to accomplish two different ranges for soft handover dependent on if the candidate cell shall be added or removed as a subject for soft handover;
  second circuitry sending the respective value of the one or more parameters to the wireless device.

19. The network node as claimed in claim 18, wherein the respective value of the one or more parameters are determined so that a region having a width corresponding to the power difference value (PDIFF) is comprised in the range for soft handover, the power difference value (PDIFF) corresponding to the output power difference between said transmitters.

20. The network node as claimed in claim 18, wherein the network node further comprises:
  a receiving port configured to receive, from the wireless device, a report sent in response to the wireless device determining that a set of downlink measurements performed by the wireless device are associated with the range for soft handover, said set comprising a downlink measurement (PSERVING) on the serving cell and a downlink measurement (PCANDIDATE) on the candidate cell, and wherein the second circuitry is further configured to provide, in response to the report, a sending of a message to the wireless device, the message requesting the wireless device to perform one or more further sets of downlink measurements on the serving cell and on the candidate cell and send one or more further reports back in response thereto, thereby enabling the network node to take a decision regarding an actual handover based on at least one of said one or more further reports.

21. The network node as claimed in claim 18, wherein $CIO = Pdiff$, and $RR = Y/2$, wherein $Y \geq H$, is a value for making the width of the range for soft handover be greater than the power difference value (PDIFF) and thereby adding a safety margin.

22. A network node for supporting a handover of a wireless device from a serving cell being served by a serving base station to a candidate cell being served by a candidate base station, the network node, the serving base station and the candidate base station being comprised in a cellular communications network, wherein the network node comprises:

first circuitry determining a respective value of one or more parameters for a range for soft handover, the range of soft handover being used by the wireless device to determine if the candidate cell is available for soft handover, wherein at least one respective value of the one or more parameters is determined based on:

output power of a transmitter of the serving base station for serving the serving cell and/or of a transmitter of the candidate base station for serving the candidate cell; and a power difference value (PDIFF) that corresponds to an output power difference between the transmitter of the serving base station for serving the serving cell and the transmitter of the candidate base station for serving the candidate cell and the parameters comprise the following parameters:

an Extended Soft handover Offset, "ESO", parameter that is separate from any parameter (CIO) that is applied by the wireless device to determine if the candidate cell is a subject for actual handover; and a Reporting Range, "RR", parameter, wherein the respective value of the RR parameter and the ESO parameter is determined so that the following relation is fulfilled:

$RR - H/2 + ESO \geq PDIFF$;

wherein PDIFF>0 is the power difference value; and wherein $H \geq 0$ is a hysteresis value applied by the wireless device to accomplish two different ranges for soft handover dependent on if the candidate cell shall be added or removed as a subject for soft handover;

second circuitry sending the respective value of the one or more parameters to the wireless device.

23. The network node as claimed in claim 18, wherein the one or more parameters comprises:

a first Extended SHO Offset, "ESOSERVING", parameter associated with the serving cell and based on the output power of the transmitter of the serving base station for serving the serving cell, and a second Extended Soft handover Offset, "ESOCANDIDATE", parameter associated with the candidate cell and based on the output power of the transmitter of the candidate base station for serving the candidate cell.

24. The network node as claimed in claim 23, wherein ESOSERVING=C0−P1, and ESOCANDIDATE=C0−P2, wherein C0 is a common constant valid for the serving base station and the candidate base station, P1 is a value corresponding to the output power of said transmitter of the serving base station and P2 is a value corresponding to the output power of said transmitter of the candidate base station.

25. A wireless device for supporting a handover of the wireless device from a serving cell being served by a serving base station to a candidate cell being served by a candidate base station, the serving base station and the candidate base station being comprised in a cellular communications network, wherein the wireless device comprises:

a port receiving from a network node via the serving base station and/or via the candidate base station, a respective value of one or more parameters for a range for soft handover used by the wireless device, wherein at least one respective value of the one or more parameters is determined based on:

output power of a transmitter of the serving base station for serving the serving cell and/or of a transmitter of the candidate base station for serving the candidate cell; and a power difference value (PDIFF) that corresponds to an output power difference between the transmitter of the serving base station for serving the serving cell and the transmitter of the candidate base station for serving the candidate cell and the parameters comprise the following parameters:

an Extended Soft handover Offset, "ESO", parameter that is separate from any parameter that is applied by the wireless device to determine if the candidate cell is a subject for actual handover; and a Reporting Range, "RR", parameter, wherein the respective value of the RR parameter and the ESO parameter is determined so that the following relation is fulfilled:

$RR - H/2 + ESO \geq PDIFF$;

wherein PDIFF>0 is the power difference value; and wherein $H \geq 0$ is a hysteresis value applied by the wireless device to accomplish two different ranges for soft handover dependent on if the candidate cell shall be added or removed as a subject for soft handover;

circuitry applying the range for soft handover to determine if the candidate cell is a subject for soft handover, which range for soft handover is affected by the respective value of the one or more parameters.

26. The wireless device as claimed in claim 25, wherein the respective value of the one or more parameters is determined so that a region having a width corresponding to the power difference value (PDIFF) is comprised in the range for soft handover, the power difference value (PDIFF) corresponding to the output power difference between said transmitters.

27. The wireless device as claimed in claim 25, wherein the one or more parameters comprises:
  a first Extended Soft handover Offset, "ESOSERVING", parameter associated with the serving cell and based on the output power of the transmitter of the serving base station for serving the serving cell, and
  a second Extended Soft handover Offset, "ESOCANDIDATE", parameter associated with the candidate cell and based on the output power of the transmitter of the candidate base station for serving the candidate cell.

28. The wireless device as claimed in claim 27, wherein ESOSERVING=C0−P1, and ESOCANDIDATE=C0−P2, wherein C0 is a common constant valid for the serving base station and the candidate base station, P1 is a value corresponding to the output power of said transmitter of the serving base station and P2 is a value corresponding to the output power of said transmitter of the candidate base station.

29. The wireless device as claimed in claim 27, wherein the applying circuitry is further configured to perform a set of downlink measurements, said set comprising a downlink measurement (PSERVING) on the serving cell and a downlink measurement (PCANDIDATE) on the candidate cell, and to determine, based on the received respective values of the ESOSERVING and ESOCANDIDATE parameters and said set of downlink measurements, that the candidate cell is a subject for soft handover.

30. The wireless device as claimed in claim 29, wherein the applying circuitry is further configured to identify a significant difference between the respective values of the ESOSERVING and the ESOCANDIDATE parameters, and thereby identify the serving cell and the candidate cell as a pair of macro and pico cells, and to determine that the candidate cell is a subject for soft handover in response to the identified significant difference.

31. The wireless device as claimed in claim 29, wherein the applying circuitry is further configured to compute a difference (PDELTA) between a first value and a second value, wherein the first value is based on ESOSERVING and the downlink measurement (PSERVING) on the serving cell and the second value is based on ESOCANDIDATE and the downlink measurement (PCANDIDATE) on the candidate cell, and to compare the difference (PDELTA) with a value based on a Reporting Range, "RR" parameter applied by the wireless device.

32. A wireless device for supporting a handover of the wireless device from a serving cell being served by a serving base station to a candidate cell being served by a candidate base station, the serving base station and the candidate base station being comprised in a cellular communications network, wherein the wireless device comprises:
  port receiving from a network node via the serving base station and/or via the candidate base station, a respective value of one or more parameters for a range for soft handover used by the wireless device, wherein at least one respective value of the one or more parameters is determined based on:
    output power of a transmitter of the serving base station for serving the serving cell and/or of a transmitter of the candidate base station for serving the candidate cell; and
    a power difference value (PDIFF) that corresponds to an output power difference between the transmitter of the serving base station for serving the serving cell and the transmitter of the candidate base station for serving the candidate cell and the parameters comprise the following parameters:
      a Reporting Range, "RR", parameter; and
      a Cell Individual Offset, "CIO", parameter associated with the candidate cell where the RR parameter and the CIO parameter are determined so that the following relation is fulfilled:

$RR-H/2+CIO \geq PDIFF$;

wherein PDIFF>0 is the power difference value; and
      wherein H>=0 is a hysteresis value applied by the wireless device to accomplish two different ranges for soft handover dependent on if the candidate cell shall be added or removed as a subject for soft handover; and
  circuitry applying the range for soft handover to determine if the candidate cell is a subject for soft handover, which range for soft handover is affected by the respective value of the one or more parameters.

* * * * *